United States Patent
Ribo et al.

(10) Patent No.: US 12,188,523 B2
(45) Date of Patent: Jan. 7, 2025

(54) DEVICE FOR COUPLING TWO SHAFTS, AND HITCHING DEVICE PROVIDED WITH SUCH A COUPLING DEVICE

(71) Applicant: TRACTO-LOCK, Verdun en Lauragais (FR)

(72) Inventors: Romain Ribo, Verdun en Lauragais (FR); Cyril Mouret, Verdun en Lauragais (FR)

(73) Assignee: TRACTO-LOCK, Verdun en Lauragais (FR)

( * ) Notice: Subject to any disclaimer, the term of this patent is extended or adjusted under 35 U.S.C. 154(b) by 453 days.

(21) Appl. No.: 17/613,540

(22) PCT Filed: May 20, 2020

(86) PCT No.: PCT/FR2020/050846
§ 371 (c)(1),
(2) Date: Nov. 23, 2021

(87) PCT Pub. No.: WO2020/240120
PCT Pub. Date: Dec. 3, 2020

(65) Prior Publication Data
US 2022/0252110 A1  Aug. 11, 2022

(30) Foreign Application Priority Data

May 24, 2019  (FR) ..................................... 1905536

(51) Int. Cl.
*F16D 11/14* (2006.01)
*F16D 11/10* (2006.01)
(Continued)

(52) U.S. Cl.
CPC .............. *F16D 11/14* (2013.01); *F16D 11/10* (2013.01); *A01B 59/062* (2013.01); *F16D 2011/008* (2013.01); *F16D 2500/10462* (2013.01)

(58) Field of Classification Search
CPC ....... F16D 11/14; F16D 23/142; A01B 59/062
See application file for complete search history.

(56) References Cited

U.S. PATENT DOCUMENTS 1,540,247 A * 6/1925 Bowman .................. F16D 11/10
                                                    192/89.29
2,897,679 A * 8/1959 Broatch .................. G03B 15/00
                                                    74/125.5
(Continued)

FOREIGN PATENT DOCUMENTS

CA    2940574 A1    9/2015
DE    1524593 A1    11/1970
(Continued)

OTHER PUBLICATIONS

PCT, International Search Report for PCT/FR2020/050846, Aug. 11, 2020.
(Continued)

*Primary Examiner* — Stacey A Fluhart
(74) *Attorney, Agent, or Firm* — ORRICK, HERRINGTON & SUTCLIFFE LLP; K. Patrick Herman; Richard F. Martinelli

(57) ABSTRACT

Device for coupling two shafts end-to-end, comprising a pair of dog clutch members (16, 28).
Each dog clutch member is configured so as to be able to be secured to an end of a shaft to be coupled, and the two dog clutch members (16, 28) have complementary shapes.
A first dog clutch member (16) is pivotably mounted in a first casing (6).

(Continued)

A second dog clutch member (28) is pivotably mounted in an intermediate bearing (8).

The intermediate bearing (8) is slidably mounted in a second casing (10) assumed to be fixed, the intermediate bearing (8) being able to slide relative to the second casing (10) in a direction parallel to the two shafts to be coupled, termed the longitudinal direction.

The intermediate bearing (8) is elastically prestressed in the direction of the first casing (6).

14 Claims, 21 Drawing Sheets

(51) Int. Cl.
*A01B 59/06* (2006.01)
*F16D 11/00* (2006.01)

(56) References Cited

U.S. PATENT DOCUMENTS

| 3,204,731 | A | * | 9/1965 | Bent | F16D 55/26 |
| | | | | | 192/108 |
| 3,385,407 | A | | 5/1968 | Kleinhans et al. | |
| 3,672,477 | A | * | 6/1972 | Moran | F16D 41/02 |
| | | | | | 192/38 |
| 2010/0108458 | A1 | * | 5/2010 | Harris | F16D 23/12 |
| | | | | | 192/69 |
| 2015/0230388 | A1 | | 8/2015 | Tracto-Lock | |
| 2017/0071121 | A1 | | 3/2017 | Tracto-Lock | |
| 2017/0167544 | A1 | * | 6/2017 | Beesley | F16H 25/20 |

FOREIGN PATENT DOCUMENTS

| DE | 102019110478 A1 | 10/2020 | |
| EP | 2098741 A2 | 9/2009 | |
| EP | 3924199 A0 | 12/2021 | |
| FR | 2552251 A * | 3/1985 | D03C 1/16 |
| FR | 2995756 | 3/2014 | |
| FR | 3018029 | 9/2015 | |
| GB | 717404 A * | 10/1954 | F16D 11/10 |
| JP | 1989009510 | 1/1989 | |
| JP | 1990049811 | 4/1990 | |

OTHER PUBLICATIONS

Office Action in CA3140740, mailed Oct. 23, 2023, 9 pages.
Office Action in JP2021569839, mailed Apr. 2, 2024, 12 pages.
Office Action in FR20737262.4, mailed May 29, 2024, 10 pages.
Office Action in EP20737262.4, mailed May 29, 2024, 10 pages.

* cited by examiner

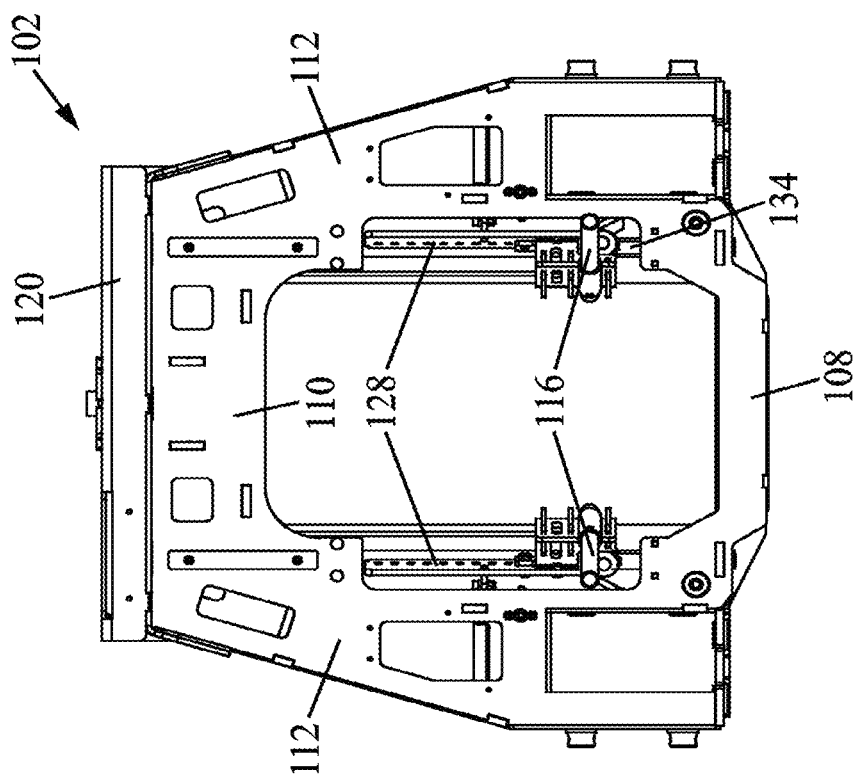
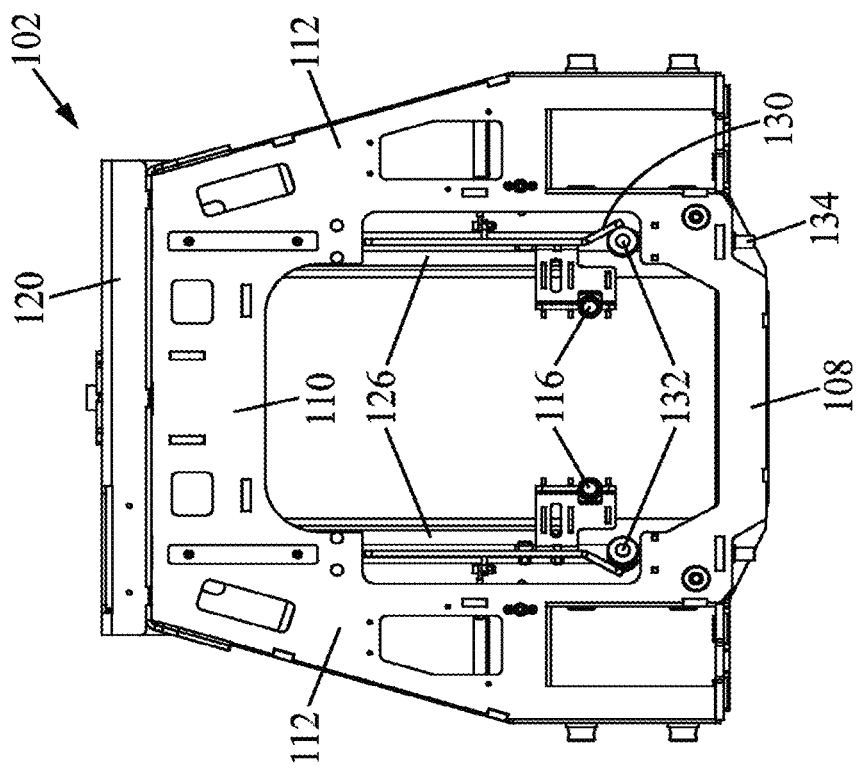

DEVICE FOR COUPLING TWO SHAFTS, AND HITCHING DEVICE PROVIDED WITH SUCH A COUPLING DEVICE

This invention concerns a device for coupling two shafts. It relates more particularly to a coupling between a driving shaft and a driven shaft. The invention also concerns a hitching device which comprises a device for coupling two shafts.

TECHNICAL FIELD

The technical problem at the origin of the device, which will be described further below, is to couple a driven shaft to a driving shaft semi-automatically when an implement provided with a receiving shaft, such as an agricultural implement for example, is hitched to a machine, such as an agricultural tractor for example, equipped with a driving shaft, commonly called a power take-off in the agricultural field. Semi-automatic coupling allows the operator of the machine to achieve the coupling from a driving station of the machine, while remaining at a distance from the coupling means.

PRIOR ART

Documents FR2995756 and FR3018029 each relate to a hitching device intended in particular for coupling an agricultural implement to a machine such as an agricultural tractor. The implement is then fitted with a towed frame while the machine is fitted with a towing frame.

These documents show means for achieving a semi-automatic hitching of an implement to a machine, said hitching being performed by a driver of the machine without the driver having to leave his driving station.

Document EP2098741 relates to a disengagement/disconnect assembly for disengaging a generator from a gear box, comprising a first inner ball screw having an angled threading on its outer surface and surrounding and engaged with a rotating generator drive shaft to cause rotation of the inner ball screw. The inner ball screw may be attached to an engagement member having undercut and interlockable teeth engaged to corresponding teeth of an engagement member of the gear box. An outer ball screw may surround and normally rotate with the inner ball screw. A helical ball track may be formed between the inner and outer ball screws. A brake may be provided for slowing or stopping rotation of the outer ball screw so that the inner ball screw rotates relative to the outer ball screw along the ball track and slides axially away from the gear box, thereby disengaging the generator from the gear box drive shaft.

The technical problem is to improve the existing systems, in particular by simplifying them, while ensuring a semi-automatic coupling and a perfect transmission of power from the machine to the implement under all circumstances.

SUMMARY

This disclosure improves the situation.

A device for coupling two shafts end-to-end is proposed, comprising a pair of dog clutch members, each dog clutch member being configured so as to be able to be secured to an end of a shaft to be coupled, and the two dog clutch members being of complementary shapes.

According to the invention, a first dog clutch member is pivotably mounted in a first casing; a second dog clutch member is pivotably mounted in an intermediate bearing; the intermediate bearing is slidably mounted in a second casing assumed to be fixed, the intermediate bearing being able to slide relative to the second casing in a direction parallel to the two shafts to be coupled, termed the longitudinal direction; and the intermediate bearing is elastically prestressed in the direction of the first casing.

Such a structure allows two shafts to be coupled, each shaft being rotatably mounted in its own casing. Each shaft is associated with a dog clutch member. For coupling, the shafts are then aligned and pushed towards each other. There is then little chance that the dog clutch members are oriented relative to each other so that the teeth of the dog clutch members engage directly. One shaft can be rotated in relation to the other to obtain a relative orientation of the dog clutch members enabling their engagement by translation. The proposed structure then allows one dog clutch member to move axially relative to the other and then ensures proper engagement of the teeth of the dog clutch members due to the elastic preload.

The term "dog clutch member" is used here to mean a mechanical coupling means comprising teeth and grooves making it possible to achieve direct coupling with a coupling means of the same type, of complementary shape.

To facilitate aligning the shafts, provision may be made, for example, for the first casing to carry a first conical surface facing the second casing, for the second casing to carry a second conical surface facing the first casing, the two conical surfaces being of complementary shapes so as to achieve an alignment of the two shafts, for the first conical surface or the second conical surface to be mounted to slide longitudinally relative to the casing which carries it, and for the sliding conical surface to be elastically preloaded in the direction of the other conical surface.

In this last variant embodiment, to ensure that proper alignment is achieved before the dog clutch members engage, provision may be made for the sliding conical surface and the corresponding casing to be provided with delay means such that movement of said conical surface can only be initiated when a predefined minimum load in the longitudinal direction is exerted on said conical surface towards the casing which carries it. Here, the centering members corresponding to the conical surfaces (male and female) and which are of complementary shapes, fit together and allow perfect pre-positioning of the coupling members formed by the dog clutch members. It is thus ensured that the coupling members are correctly positioned relative to each other so as to avoid any mechanical breakage. A phase is preferably provided in which the dog clutch members are perfectly aligned but not yet in contact with each other.

According to an advantageous variant embodiment, the delay means may comprise at least one guide rod integral with the sliding conical surface; said guide rod may comprise a region of narrowed cross-section which can slide within a bore inside the corresponding casing; the corresponding casing may comprise a slot extending transversely relative to the bore at least partially receiving the guide rod and intersecting said bore, and an elastic member (as a non-limiting example: an R-clip) having two arms can be housed in said slot, the narrowed cross-section being arranged between the two arms of the elastic member (for example the R-clip).

Those skilled in the art will immediately be able to find other means for achieving the mentioned delay function. This function may for example also be performed by one or more elastically preloaded ratchets. While in these examples this function is automatically carried out mechanically, it could also be controlled and carried out by an actuator, for example hydraulic. This delay function is advantageous for guaranteeing a pre-positioning of the coupling members (dog clutch members) and a clutching with no risk of breakage.

An advantageous embodiment of such a coupling device may further provide that said device comprises connection and locking means, said means comprising, on each side of a dog clutch member in each case, a projection integral with the corresponding casing, the other casing carrying, on the one hand, guide means in each case for bringing a projection towards a housing, and on the other hand, a hook mounted to pivot about a transverse shaft between a so-called open position allowing the projection to enter and exit its housing and a so-called closed position in which the hook can keep the projection in its housing by preventing its exit.

In this embodiment, it is also possible to provide that:
the two hooks are mounted to pivot on a common transverse shaft, and the movement of the hooks is controlled by a double-acting hydraulic cylinder; and/or
at least one hook carries a locking pin intended to cooperate with a pair of jaws, said jaws being carried by the same casing (10) as the one carrying the hooks and being arranged so that the locking pin is located between the jaws when the corresponding hook is in the closed position.

In the case where jaws are provided, it is then possible for example to provide that, for each pair of jaws, one jaw is fixed and the other is movable, that a return spring prestresses the movable jaw towards the fixed jaw, and that a cylinder makes it possible to act against the return spring to move the movable jaw away from the fixed jaw.

According to another aspect, a hitching device is proposed for hitching an implement, such as an agricultural implement, to a lifting system of a machine, such as an agricultural tractor, equipped with a driving output shaft, comprising:
a first frame known as the towing frame and equipped with attachment members enabling attachment to the lifting system of the machine,
a second frame called a towed frame and equipped with attachment members enabling attachment to the implement,
the towing frame and the towed frame each having a joining face, said joining faces being suitable for enabling the pairing of the towed frame to the towing frame,
means for relative locking of the towed frame to the towing frame in the paired position,
characterized in that said hitching device further comprises a coupling device for coupling two shafts end-to-end as described above,
said coupling device being intended to be mounted between the driving output shaft of the machine and a driven shaft of the implement.

In such a hitching device, the towed frame may for example comprise two arms mounted to pivot between a close-together position in which the free ends of the arms carry the first casing of the coupling device and an open position in which the arms are spaced apart and their free ends are at a distance from the first casing.

In a preferred embodiment of this hitching device, the towing frame has a welded structure comprising a crossmember from which two legs extend on a same side of said crossmember; the towed frame may also have a welded structure comprising an upper crossmember, a lower crossmember, and two uprights connecting the ends of the lower crossmember to the ends of the upper crossmember; the crossmember of the towing frame advantageously has at least two centering pins and the upper crossmember of the towed frame comprises a cap extending towards the towing frame and having at least two housings each intended to receive a centering pin.

In this embodiment, it is also possible to provide that each leg of the towing frame has at its free end a plate on which is arranged at least one locking finger, and that the lower crossmember of the towed frame comprises locking holes arranged to accommodate the locking fingers.

According to a preferred embodiment, the hitching device comprises for example actuating means for actuating the pivotably mounted arms, said actuating means cooperating with the plate on which is arranged at least one locking finger such that, in the locking position of the towed frame to the towing frame, the arms are in their open position.

For a hitching device as described here, provision is made, for example, for the first casing of the coupling device to be mounted on the towed frame side, while the second casing is mounted on the towing frame side.

BRIEF DESCRIPTION OF DRAWINGS

Other features, details, and advantages will be apparent from reading the following detailed description, and from analyzing the appended drawings, in which:

FIG. 18 is an elevation view of the implement side of a frame corresponding to FIG. 14.

FIG. 19 is an elevation view of the towed frame of FIG. 18 in its position corresponding to FIG. 15.

DESCRIPTION OF EMBODIMENTS

The attached drawing and the description below contain elements that, for the most part, are definite in nature. They can therefore not only serve to provide a better understanding of this disclosure but can also contribute to its definition, where appropriate.

Figure 1:
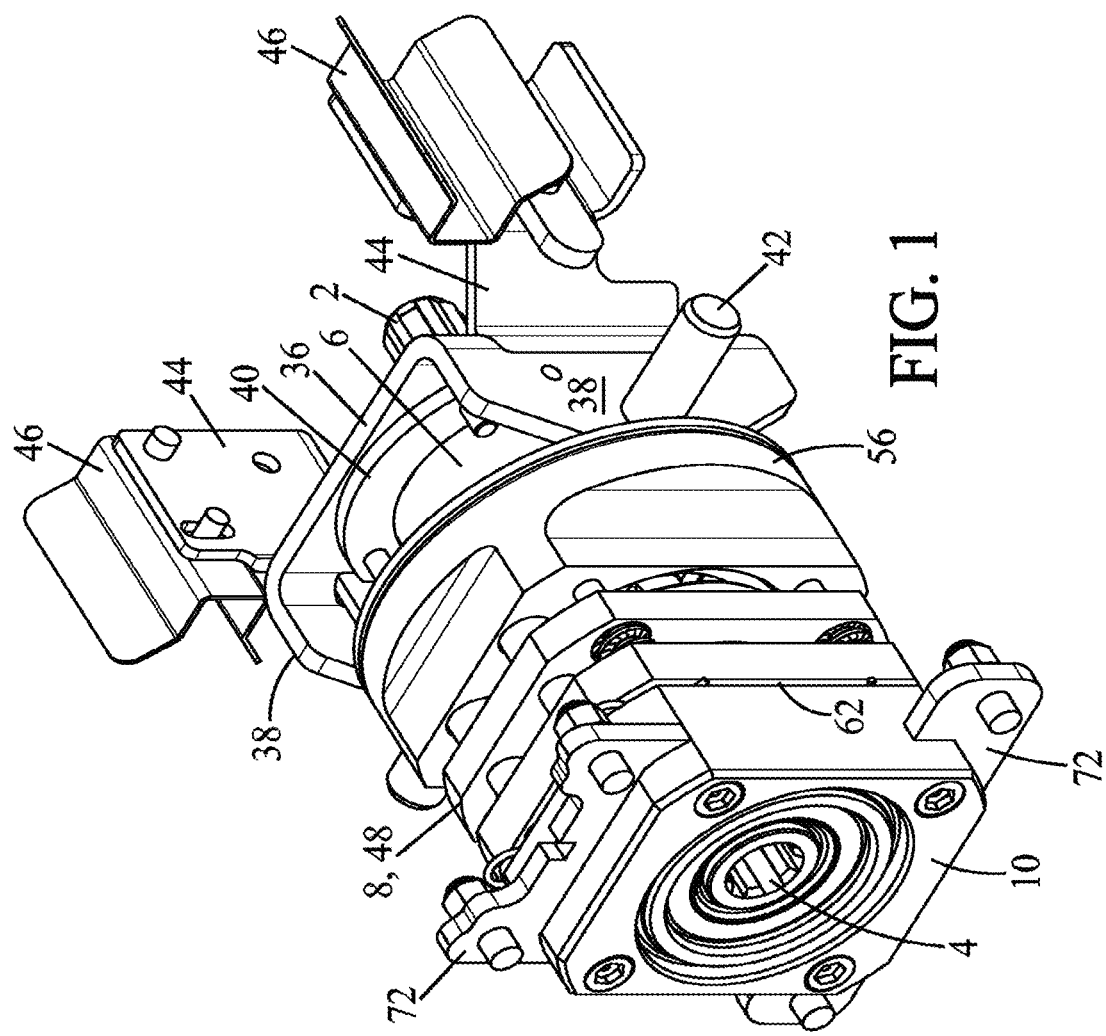
FIG. 1 shows a perspective view of a device for coupling two shafts.

Reference is now made to FIG. 1. It shows a device for coupling two shafts. It is assumed here that the two shafts to be coupled are splined shafts, one shaft having a male end while the other has a female end. The device illustrated in FIG. 1 then comprises a male coupling part 2 (to receive the female shaft end) as well as a female coupling part 4 (to engage with the male shaft end). Those skilled in the art will understand from reading the following description that the coupling device described can also couple two shafts each having a male end or two shafts with female ends.

The male coupling part 2 is mounted by means of rolling bearings in a first casing 6 while the female coupling part 4 is mounted by means of rolling bearings in an intermediate bearing 8, itself mounted to slide in a second casing 10 distinct from the first casing 6. This structure will be better understood in conjunction with FIGS. 2, 3, and 4, which show a longitudinal section view of the device of FIG. 1.

In the remainder of the description, the longitudinal direction is considered to be the direction given by the coupled shafts and therefore here also by the female coupling part 2 and the male coupling part 4.

The male coupling part 2 has a connection end 12, a solid cylindrical body 14, and a first dog clutch head 16.

The connection end 12 is shaped to match a shaft end to be coupled. Here it is intended to engage with a female housing (not shown). In the embodiment illustrated as a non-limiting example, the connection end 12 is in the form of a splined shaft. This end is extended by the solid cylindrical body 14. The latter is intended to carry a pair of rolling bearings 18 and its peripheral outer surface is machined to receive these rolling bearings 18. This surface is not described in detail. However, it comprises for example a stop for a rolling bearing, a machined surface serving as a seat for the rolling bearings 18, a threaded part to receive a nut 20, as well as an area intended to cooperate with a seal 22 in order to protect the rolling bearings 18.

The first dog clutch head 16 may form a single part with the solid cylindrical body 14 and the connection end 12. This part is obtained by machining in the example illustrated. The first dog clutch head 16 forms the end of this part that is opposite to the connection end 12. It has a larger diameter than the solid cylindrical body 14. It has a transverse face from which protrude teeth 24 regularly arranged at the periphery of this transverse face.

As for the female coupling part 4, it has a tubular cylindrical body 26 and a second dog clutch head 28. The first dog clutch head 16 and the second dog clutch head 28 together form a dog clutch, i.e. a device for the direct coupling of two parts, or dog clutch members, by teeth and grooves.

The tubular cylindrical body 26 has a housing 30 suitable for receiving a shaft end to be coupled. Of course, it is therefore necessary to adapt the shape of the housing 30 to the shape of the shaft. In the illustrated embodiment, the housing 30 is a housing for receiving a splined shaft (not shown). The outer surface of this tubular cylindrical body is machined to receive a pair of rolling bearings 18'. This surface is not described in detail. However, it comprises for example a stop for a rolling bearing, a machined surface serving as a seat for the rolling bearings 18', a threaded portion for receiving a nut 20', and an area for receiving a seal 22' in order to protect the rolling bearings 18'.

The second dog clutch head 28 is suitable for engaging with the first dog clutch head 16. The diameter of this second dog clutch 28 corresponds to the diameter of the first dog clutch head 16. This second dog clutch head 28 also has a transverse face from which protrude teeth 24'. These teeth are intended to mesh with the teeth 24 of the first dog clutch head 28.

The first casing 6 is a tubular part, its inner surface machined to receive the outer rings of the rolling bearings 18. The housing formed inside this first casing 6 to receive the rolling bearings 18 is closed at one end by the seal 22. On the side opposite this seal, i.e. the side of the first dog clutch head, a seal 22 is also provided between the first dog clutch head 16 and the first casing 6.

At the first dog clutch head 16, the first casing 6 carries a first centering ring 32 which, in the embodiment proposed in the drawing, is a separate part from the first casing 6 and is assembled by screwing onto a flange provided for this purpose on the first casing 6 near the first dog clutch head 16. This first centering ring 32 has a frustoconical outer surface which is coaxial with the first casing 6 and the male coupling part 2.

On the side opposite to the first dog clutch head 16, the first casing 6 is provided with means for attachment to a support 34. The support is created in several parts. In the illustrated embodiment, the support 34 comprises a stirrup-shaped part with a base 36 and two arms 38. The base 36 extends transversely relative to the male coupling part 2 and serves for the attachment of the support 34 onto the first casing 6. A flange 40 mounted on the first casing 6 is used for attaching the support 34, more precisely the base 36, onto the first casing 6. The arms 38 of the stirrup-shaped part extend perpendicularly to the base in the direction of the first dog clutch head 16. Each arm 38 carries a finger 42 which extends from the arm 38 towards the outside of the stirrup, i.e. extending away from the first casing 6. The two fingers 42 are arranged on the arms 38 so as to be coaxial (and therefore they extend transversely to the male coupling part 2). Each arm 38 also carries a lateral attachment part 44 which extends longitudinally outward, extending away from the first casing 6. These lateral attachment parts 44 are adapted to the implement onto which the support 34 and the corresponding male coupling part 2 are to be mounted. In the embodiment illustrated as a non-limiting illustrative example, the lateral attachment parts 44 each have an attachment plate to which is fixed on the outer face thereof a U-shaped section part 46, the free edges of the arms of the U being flared and the section part 46 being oriented longitudinally.

As mentioned above, the female coupling part 4 is arranged within the intermediate bearing 8, itself mounted to be movable in longitudinal translation within the second casing 10 assumed to be fixed.

The intermediate bearing 8 is a tubular part, its inner surface machined to receive the outer rings of the rolling bearings 18' in which the female coupling part 4 is mounted. The housing formed inside this intermediate bearing 8 for receiving the rolling bearings 18' is closed at one end by the seal 22'. On the side opposite this seal, meaning the side of the second dog clutch head 28, another seal 22' is also provided between the second dog clutch head 28 and the intermediate bearing 8.

The intermediate bearing 8 further comprises a flange 48, near the second dog clutch head 28. This flange 48 carries the seal 22'. It may also be provided with longitudinal bores to allow its guidance relative to the second casing 10 as well as longitudinal bores for the passage of guide rods as explained below with particular reference to FIGS. 5 and 6.

The second casing 10 is assumed to be fixed in this description. It thus serves as a reference for the relative movements of the various parts which will be explained below. The second casing 10 has a generally parallelepipedal shape traversed by a longitudinal central bore through which slides the movable assembly formed by the female coupling part 4 and the intermediate bearing 8. At the periphery of this central bore, are located longitudinal blind holes and longitudinal traversing bores. In the illustrated embodiment, four blind holes and four traversing bores are provided. The four blind holes are similar, with an internal thread at the bottom of the hole, arranged longitudinally, and open onto the same face of the second casing 10, called the rear face.

As already mentioned, the female coupling part 4 and the intermediate bearing 8 form a movable assembly relative to the second casing 10. Guidance is provided by the central bore of the second casing 10. In the embodiment illustrated as a non-limiting example, a cushion 50 arranged between two wiper seals 52 is provided between the outer face of the intermediate bearing and the inner surface of the central bore of the second casing 10.

Figure 5:
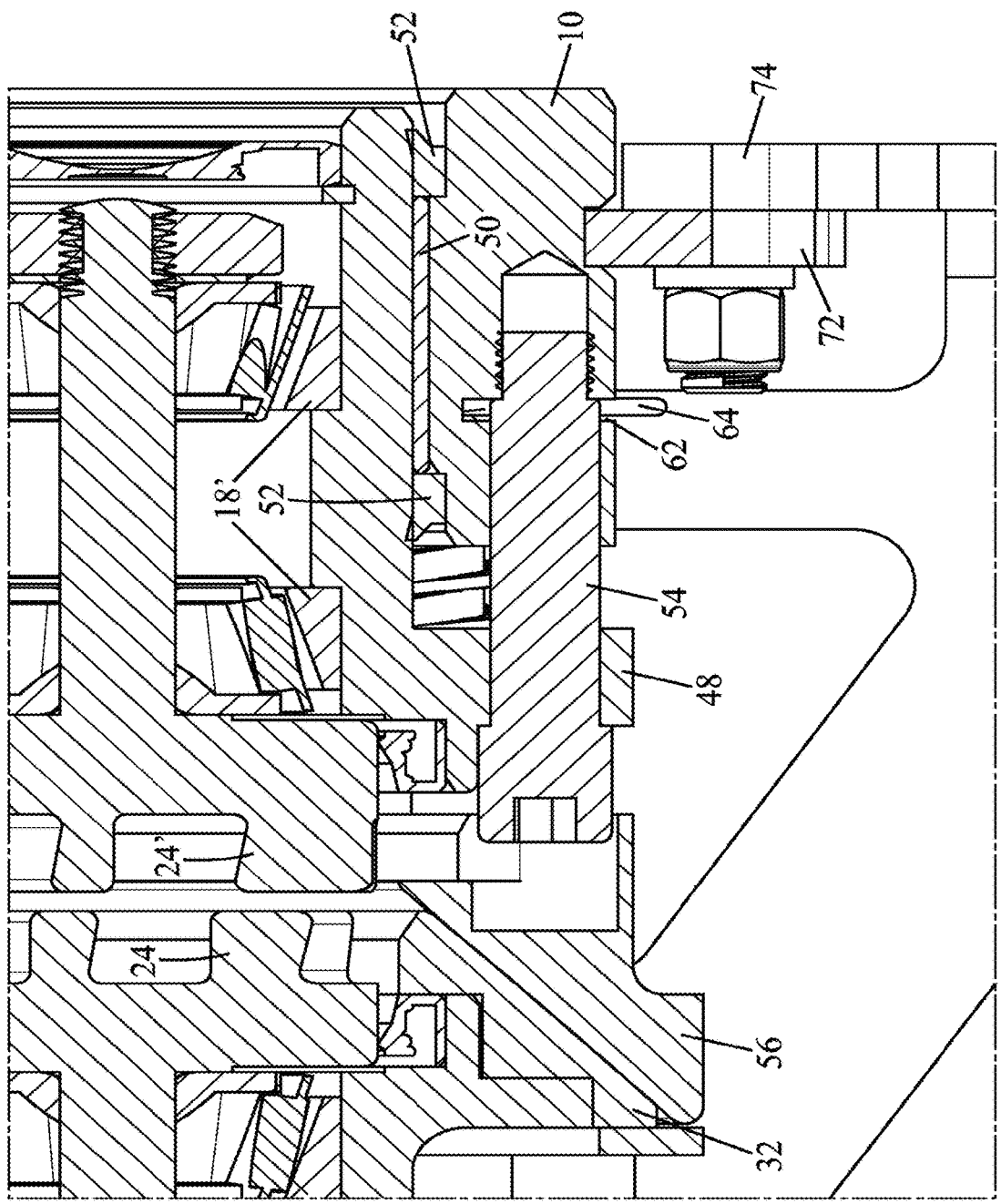
FIG. 5 is a detailed section view in the first position of FIG. 2.

For guiding the movable assembly, in particular to avoid rotation of this movable assembly relative to the second casing 10, four first guide rods 54 are provided. Referring to FIG. 5 which is a section view on an enlarged scale of the coupling device in the first position of FIG. 2 but in a longitudinal section plane passing through a first guide rod 54. The latter is in the form of a screw with a head, a body, and a threaded end opposite to the head of the screw. The threaded end of each first guide rod 54 is screwed into a blind hole in the second casing 10. The body of each first guide rod 54 forms a guide column for the flange 48 of the intermediate bearing 8. The screw head of each first guide rod 54 forms a shoulder serving as a stop for the flange 48 as illustrated in FIG. 5. The flange 48 being located between the screw heads and the rear face of the second casing 10, i.e. the face which the blind holes open onto, the maximum travel of the movable assembly is defined by the distance separating the screw head of each first guide rod 54 from the rear face of the second casing 10, reduced by the thickness of the flange 48.

The second casing 10 also carries a second centering ring 56 intended to cooperate with the first centering ring 32. While the first centering ring 32 has an outer conical surface, the second centering ring 56 has an inner conical surface. These two conical surfaces, more precisely frustoconical, have the same apex angle such that they can come into contact with each other when their shapes are fitted together.

Figure 6:
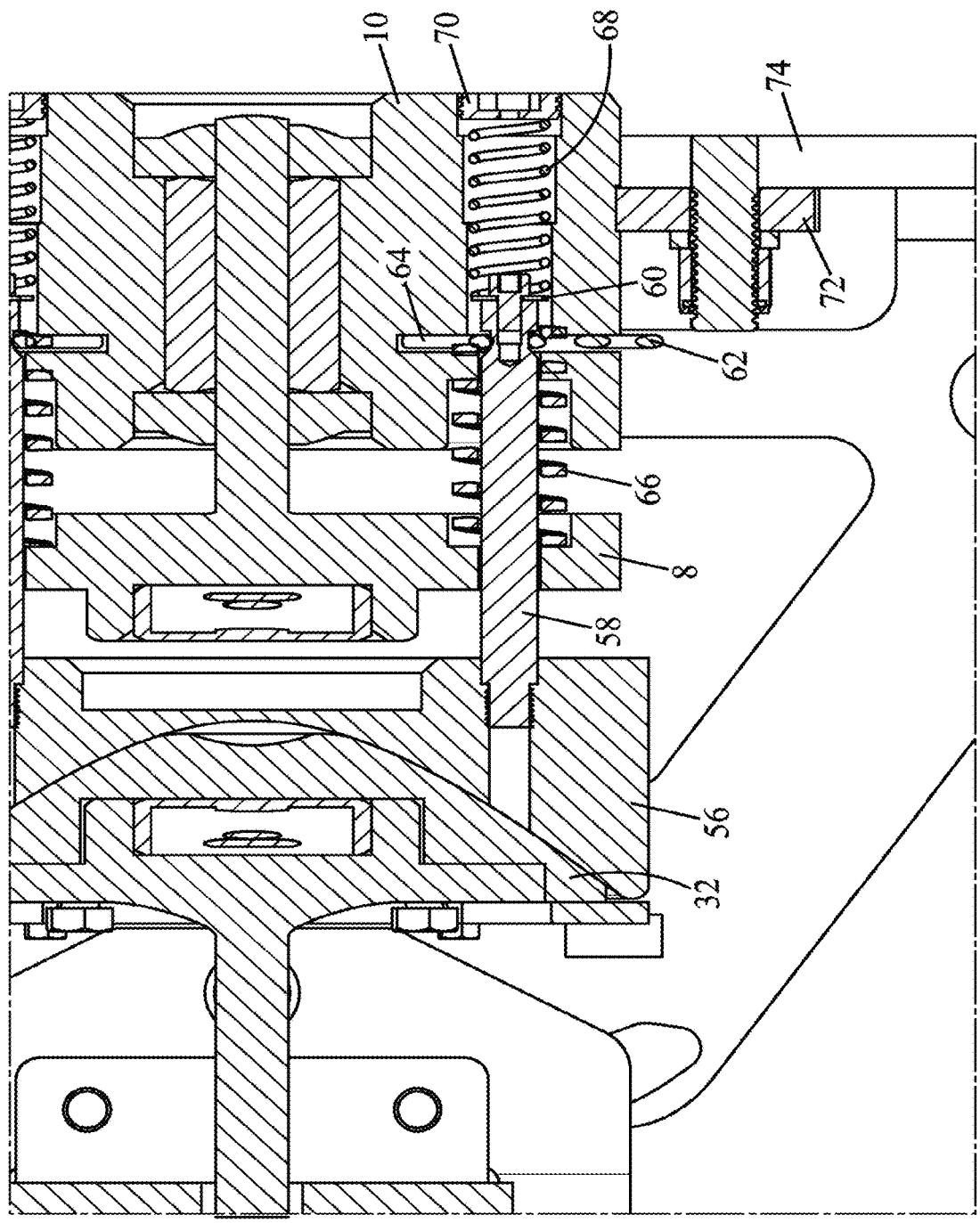
FIG. 6 is another detailed section view in the first position of FIG. 2.

The second centering ring 56 is provided with second guide rods 58 illustrated in particular in FIG. 6. In the illustrated embodiment, four similar second guide rods 58 are provided.

Each second guide rod 58 has a threaded end which engages with a threaded hole created in the second centering ring 56, to secure the second guide rod 58 to the second centering ring 56. For the correct relative positioning of the second guide rod 58 with the second centering ring 56, a shoulder of the second guide rod 58 cooperates with a shoulder created in the corresponding threaded hole.

Each second guide rod 58 then comprises a circular cylindrical body which traverses the flange 48 of the intermediate bearing 8 at a bore provided for this purpose, and enters a bore traversing the second casing 10. A narrowing extends the cylindrical body to a region of narrowed diameter. This region is followed by a shoulder, and then the end of the second guide rod 58 returns to a diameter corresponding to that of its cylindrical body. The end of the second guide rod 58 is provided with a central threaded hole which receives a screw to hold a thrust washer 60 in place.

Figure 2:
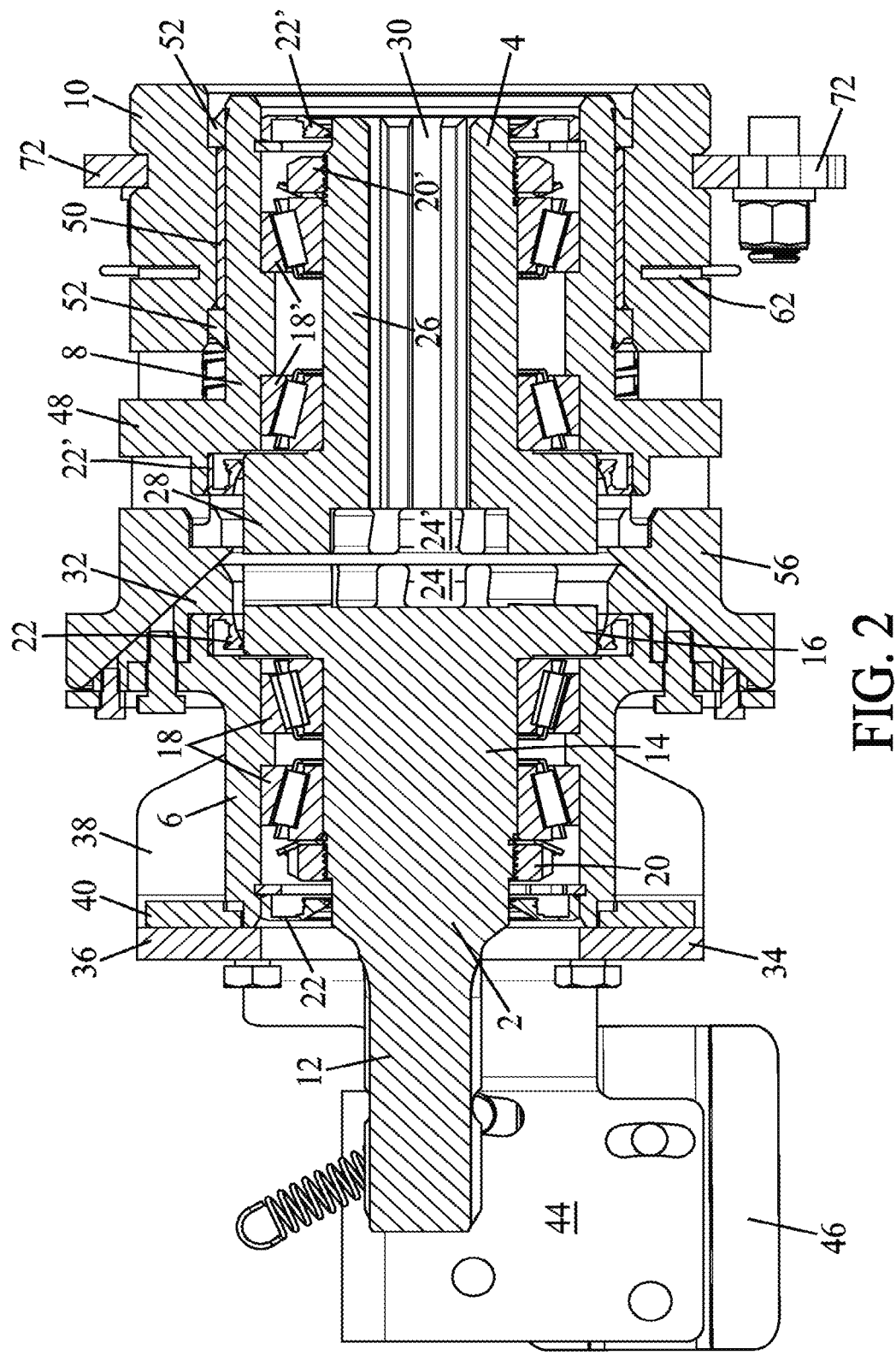
FIG. 2 is a longitudinal section view along section line II-II of the coupling device in a first position.

In FIG. 2 (and in FIG. 6), one will note that the second casing 10 may have a slot 62 at the region of reduced diameter of the second guide rod 58. This slot 62 is then used for example to enable an R-clip 64 to be inserted on the second guide rod 58. An R-clip is a clip which has two elastic arms prestressed against one another. One arm is generally substantially rectilinear while the other arm has a concave space between two convex spaces, relative to the first arm. Such an R-clip is provided so that the first arm comes to be housed in a transverse hole of a pin while the concave space then comes to bear against an outer part of the pin. In the coupling device described here, provision is made for one arm of the R-clip to pass on one side of the second guide rod 58 and for the other arm to pass on the other side of this rod, the rod being located at the concave space between two convex spaces of the clip.

One will also note the presence of springs in FIG. 6. First springs 66 may be coil springs arranged around the cylindrical body of the second guide rods 58. These first springs 66 are thus held and guided by these rods and they are arranged between the flange 48 of the intermediate bearing 8 (movable) and the second casing 10 (fixed). These first springs 66 tend to move the flange 48 of the intermediate bearing 8 away from the rear face of the second casing 10, meaning to cause the intermediate bearing 8—and the female coupling part 4—to exit the central bore of the second casing 10. Second springs 68 may be housed in the bores of the second casing 10. These second springs 68 are each mounted between a stop plug 70 and a thrust washer 60 that is mounted at the end of a second guide rod 58. These second springs 68 tend to cause the second guide rods 58 to exit their bore and therefore to move the second centering ring 56 away from the second casing 10.

As for the second casing 10, it may also have, as illustrated in the drawing, two transverse grooves created on two opposite faces such that each receives a half-clamp 72 for attachment to a support 74 (visible in FIGS. 5, 6 and 16, 17).

The operation of this device for coupling two shafts is explained with reference to FIGS. 2 to 4.

Figure 9:
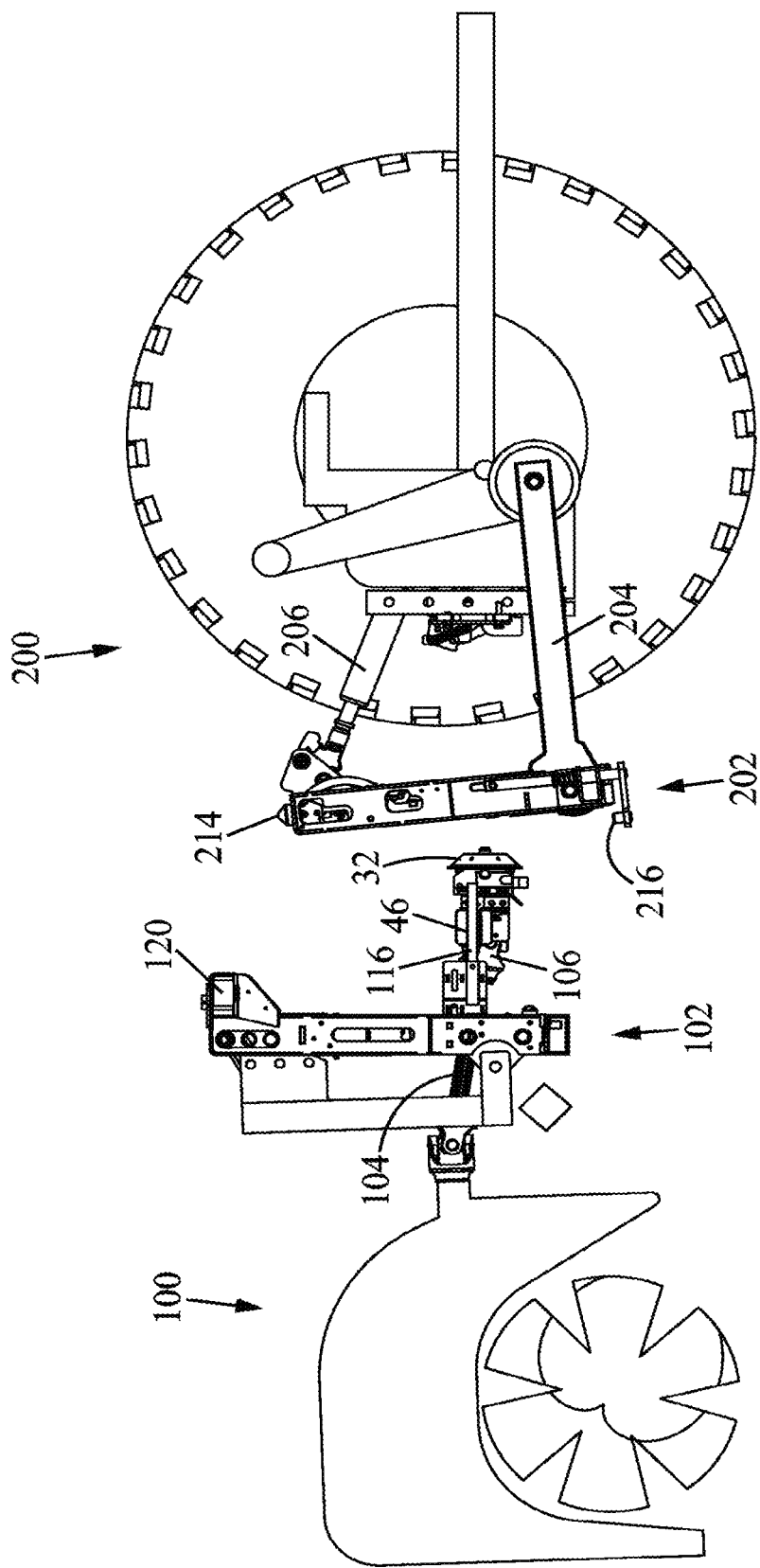
FIG. 9 shows a side view of the rear part of the agricultural tractor of FIG. 8 facing the agricultural implement of FIG. 7 before hitching.

From a position as illustrated in FIG. 9, in which the male coupling part 2 is at a distance from the female coupling part 4, these two coupling parts are brought closer together: it is assumed here that the second casing 10 is fixed and therefore that initially (between the position of FIG. 9 and that of FIG. 2), the movable assembly comprising the female coupling part 4 and the intermediate bearing 8 as well as the second centering ring 56 are stationary.

When the first centering ring 32 comes into contact with the second centering ring 56, an alignment of the two rings takes place in a known manner. The male coupling part 2 is thus also aligned with the female coupling part 4. When the alignment is achieved (first step illustrated in FIG. 2), the first dog clutch head 16 is still at a distance from the second dog clutch head 28. To achieve the coupling of the two shafts, it is necessary to cause the two dog clutch heads to mesh.

A second step (FIG. 3) is bringing the first dog clutch head 16 into contact with the second dog clutch head 28. For the first dog clutch head 16 to be able to approach the second dog clutch head 28, the second centering ring 56 must approach the second casing 10. This movement is prevented in the illustrated embodiment by the R-clips 64 arranged on the second guide rods 58. However, the R-clips 64 are elastic and when stress is exerted on the second guide rods 58, the arms of the R-clips 64 move apart and the R-clips 64 slide on the narrowing of the second guide rods 58 in order to assume position on the cylindrical body of the second guide rods 58.

The force to be exerted on the second centering ring 56 by the first centering ring 32 in order to obtain a displacement of these two rings towards the second casing 10 depends on the stiffness of the R-clips 64 and on the geometry of the second guide rods 58, in particular the diameters and slope at the narrowing. This force can therefore be adapted to specifications, during the design of the device. The resistance opposing the movement of the second centering ring 56 could be achieved by means other than those described (in particular with the R-clips), for example using a hydraulic cylinder or the like. The fact of having to exert a predetermined minimum force to obtain the movement of the second centering ring 56 (with the first centering ring 32) makes it possible to first correctly align the shafts by aligning the male coupling part 2 with the female coupling part 4 before the dog clutch heads come into contact.

When the first dog clutch head 16 abuts against the second dog clutch head 28, a force corresponding substantially to the force exerted on the second centering ring in order to move it is also exerted on the movable assembly formed by the intermediate bearing 8 and the female coupling part 4 which carries the second dog clutch head 28. The movable assembly then enters the central bore of the second casing 10 while compressing the first springs 66. These springs are then compressed in proportion to the axial force to which they are subjected, the travel of this movable assembly being limited when the flange 48 of the intermediate bearing 8 abuts against the second casing 10.

Figure 3:
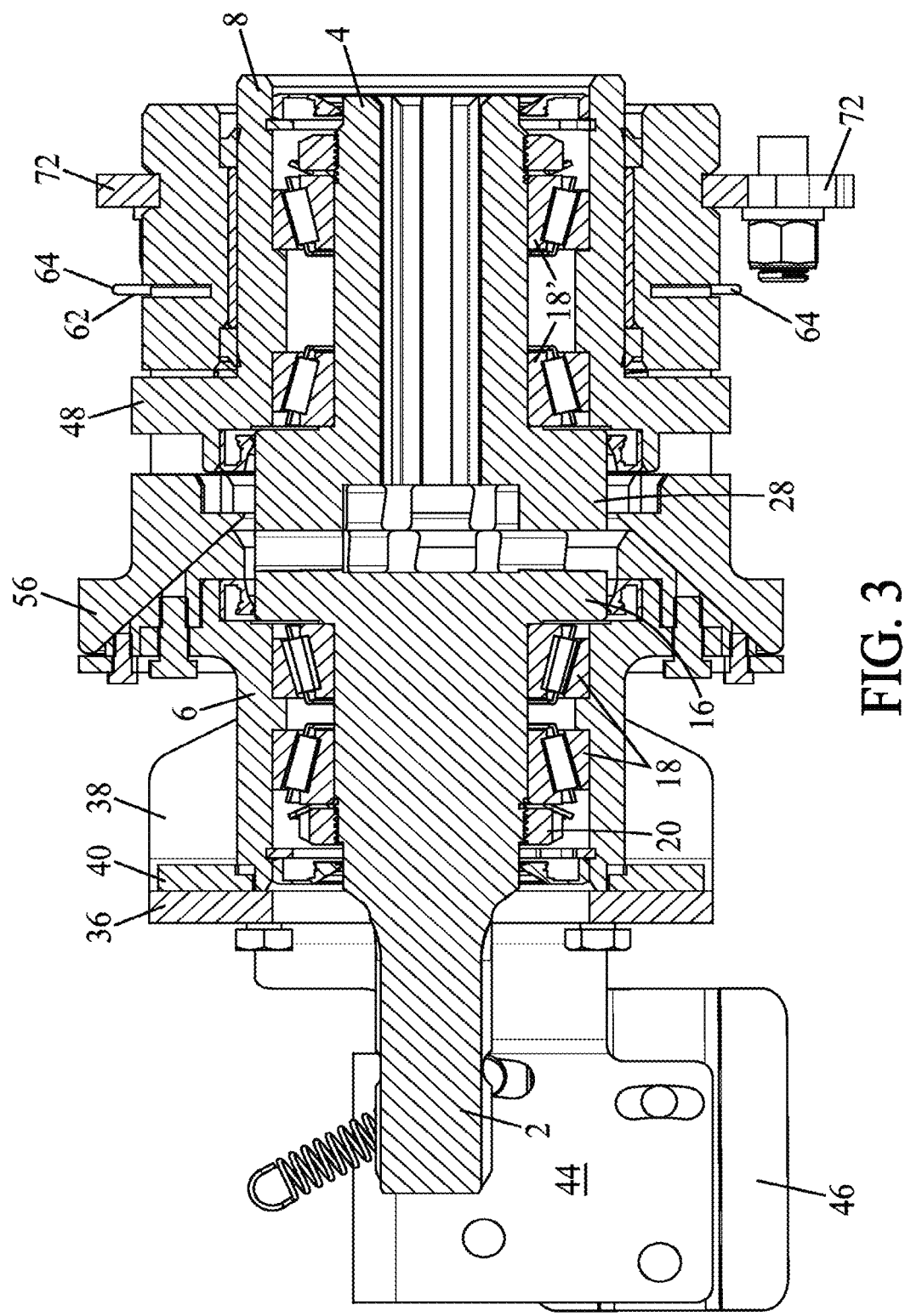
FIG. 3 is a longitudinal section view along section line II-II of the coupling device in a second position.

There is little chance that the teeth of the dog clutch members are exactly facing each other and mesh directly when the system transitions from the second position illustrated in FIG. 2 to the third position of FIG. 3. It is then necessary to rotate a shaft to bring the teeth of the dog clutch members so that they mesh with each other. Let us assume for example that the motor shaft is the one whose end is mounted in the female coupling part 4. This part is then rotated. By means of the rolling bearings 18', the female coupling part 4 rotates in the intermediate bearing 8, driving the second dog clutch head 28. The teeth 24' of this head then mesh with the teeth 24 of the first dog clutch head 16 (FIG. 4). Indeed, under the effect of the first springs 66, the movable assembly including the movable bearing 8 and the female coupling part 4 is pushed towards the male coupling part 2. At the same time, the second springs 68 press on the thrust washers 60 and exert stress on the second guide rods 58 so that the second centering ring 56 remains in contact with the first centering ring 32.

Figure 4:
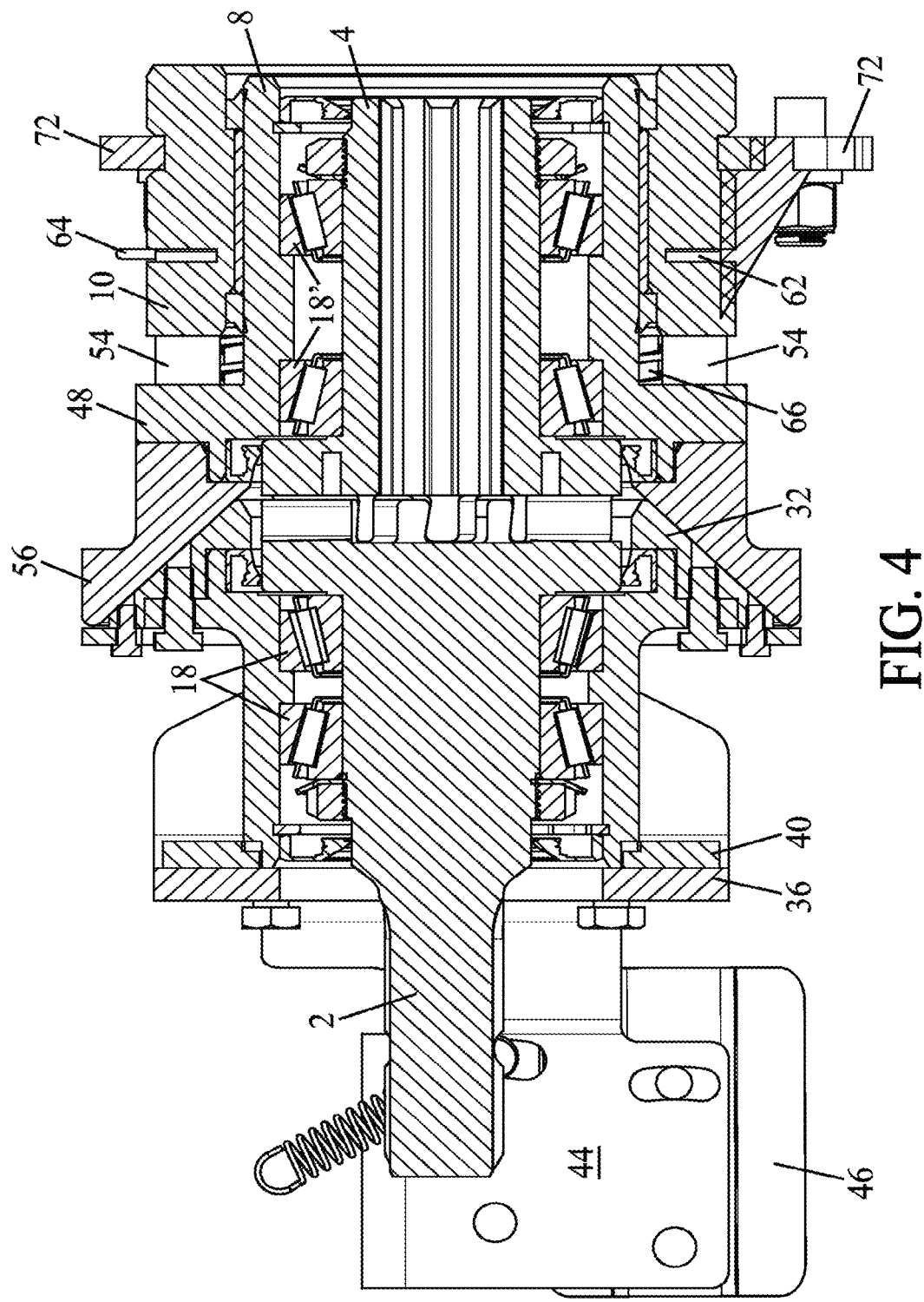
FIG. 4 is a longitudinal section view along section line II-II of the coupling device in a third position.

In the position illustrated in FIG. 4, the motor shaft, its end mounted in the female coupling part 4, drives the female coupling part 4 which rotates in the intermediate bearing 8 and drives via the dog clutch heads the male coupling part 2 which is mounted in one end of a shaft which is thus rotated. Under the effect in particular of the stress exerted by the first springs 66, the connection between the dog clutch members is maintained.

FIGS. 7 to 17 illustrate the integration of this system into a hitching device, and more specifically, as a non-limiting illustrative example, into a hitching device for hitching an agricultural implement to an agricultural tractor.

Figure 7:
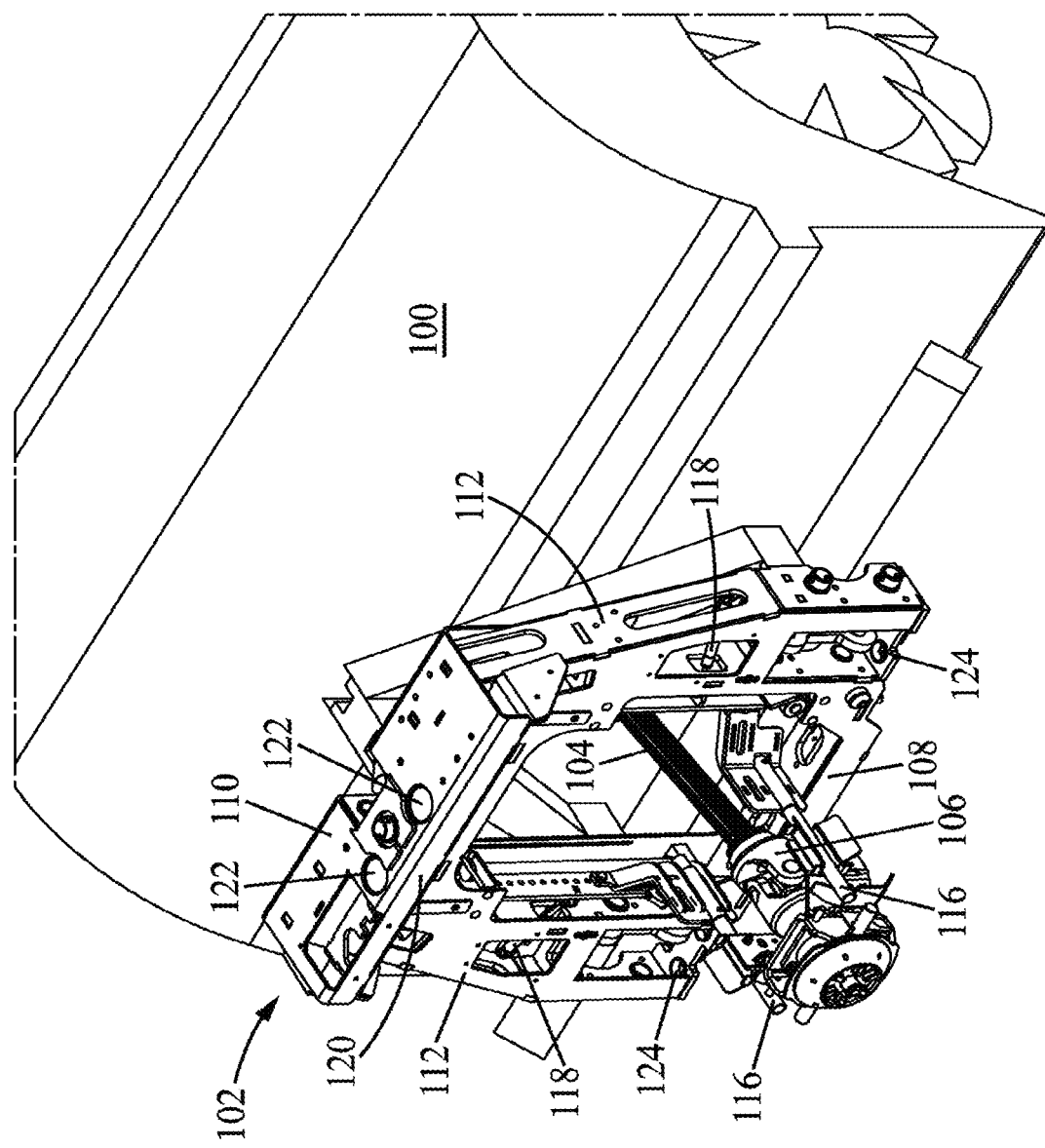
FIG. 7 schematically shows an agricultural implement provided with a towed frame and part of a coupling device of FIG. 1.

FIG. 7 illustrates an agricultural implement 100 provided with a towed frame 102 and a drive shaft 104 provided with a universal joint 106.

The agricultural implement 100 may be of any type and is not detailed here.

The towed frame 102 comprises a lower crossmember 108, an upper crossmember 110, and two uprights 112 connecting the lower crossmember 108 to the upper crossmember 110.

On one side of the universal joint 106 is the drive shaft 104 which is part of the agricultural implement and provided by its manufacturer for driving the implement. On the other side of the universal joint 106 is a socket 114 which is suitable for engaging with the male coupling part 2.

Note in FIG. 7 the presence of two support arms 116 which carry a part of the coupling device, and more precisely the part of this device comprising in particular the first casing 6 and the male coupling part 2. These support arms 116 have free ends in the form of a rod which engage with the U-shaped section parts 46. These support arms 116 are each mounted to pivot about a shaft 126 (FIG. 20) extending between the lower crossmember 108 and the upper crossmember 110. In each case, elastic means, such as the gas springs 118 in the illustrated embodiment, are provided to prestress these support arms 116 into a position (FIGS. 7, 16, and 18) in which the ends of the support arms 116 engage with the section parts 46 in order to hold a part of the coupling device in position. As will be explained further below in relation to FIG. 20, these support arms 116 can also come open into a position in which the free ends of these support arms 116 are at a distance from the coupling device.

Figure 8:
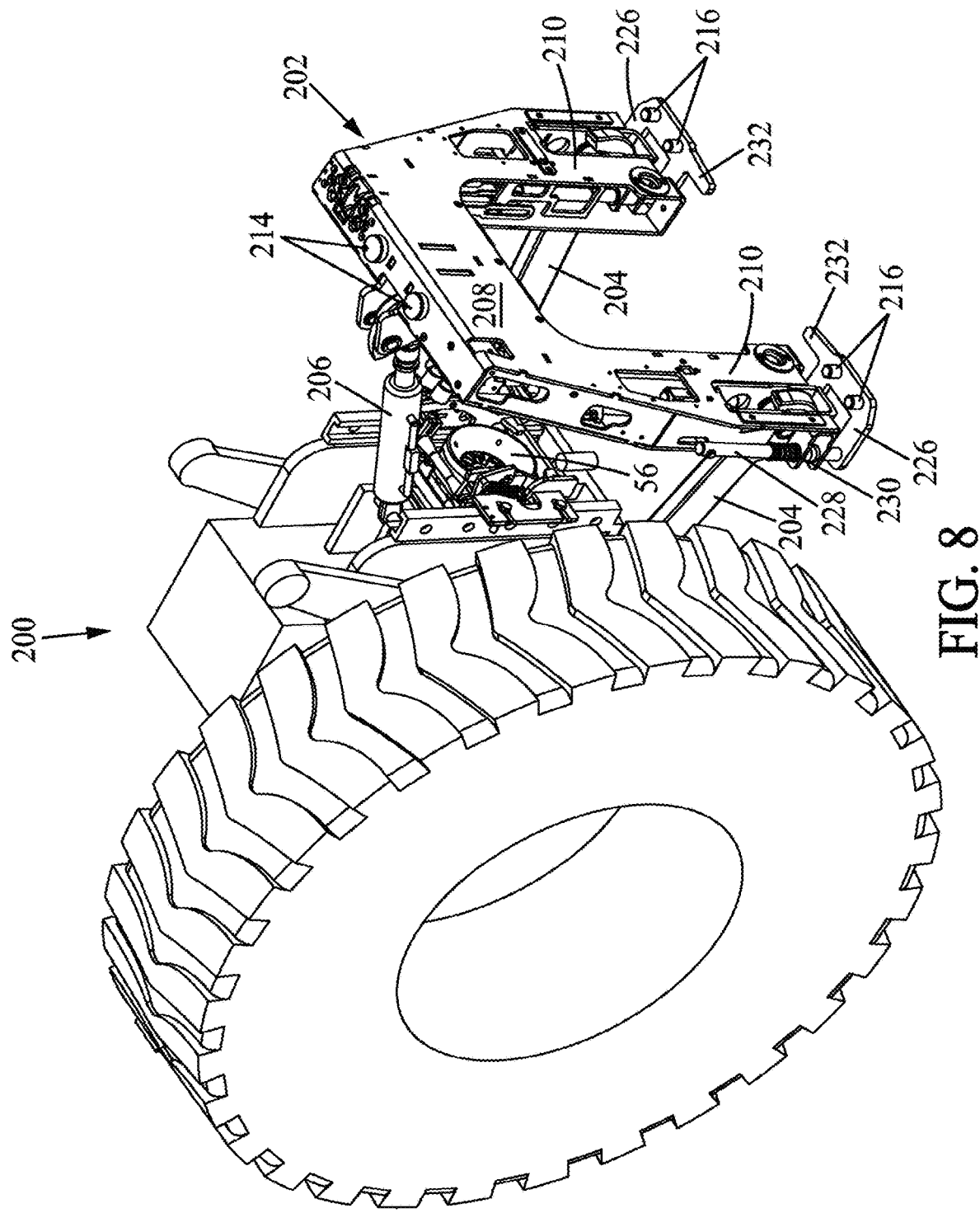
FIG. 8 schematically shows a rear part of an agricultural tractor provided with a towing frame and part of a coupling device of FIG. 1.

FIG. 8 schematically shows a rear part of an agricultural tractor 200 with a three-point lift system conventionally comprising two lower arms 204 and an upper arm 206 of variable length (here formed by a cylinder). This three-point lift system here carries the towing frame 202 of an inverted U-shape with a base 208 in the upper position and two legs 210 extending downward from base 208. The upper arm 206 (or cylinder) is connected to the base 208, substantially at the center thereof, while the lower arms 204 are each connected to a leg 210, substantially near a free end of the corresponding leg 210.

The second casing 10 is mounted by means of two half-clamps 72 on its support arranged on the tractor so that a drive shaft, often called a power take-off, comes to be housed in the female coupling part 4.

The towed frame 102 and the towing frame 202 both have for example a welded structure. They are suitable for being integrally attached to one another. Note in particular that the (upper) base 208 of the towing frame 202 is in the form of a beam of substantially square cross-section which bears two centering pins 214 on its face opposite to the legs 210. The upper crossmember 110 of the towed frame 102 is in the form of a beam with a cap 120 which projects forward (meaning towards the towing frame 202) so as to be able to cover the base 208 of the towing frame 202. Cylindrical housings 122 corresponding to the centering pins 214 are provided in the cap 120 in order to receive said centering pins 214.

Similarly, as can be seen in FIG. 8, each leg 210 of the towing frame 202 carries an end plate from which two locking fingers 216 protrude in each case. Correspondingly, the towed frame 102 has corresponding locking holes 124 at its lower crossmember 108. The two locking fingers 216 corresponding to a leg 210 are mounted on a plate 226 extending substantially perpendicularly to the corresponding leg 210 and projecting rearward relative to this leg 210. This plate 226 is slidably mounted so as to be able to move away/move towards the end of the leg 210. A cylinder (hidden inside the leg 210) makes it possible to control the movement of the plate 226 relative to the corresponding leg 210. The plate 226 is connected to its control cylinder by at least one rod 228 mounted so as to slide relative to the leg 210 and prestressed by a spring 230 into the position where the plate 226 is close to the free end of the corresponding leg 210.

FIG. 9 shows a side view of a rear part of an agricultural tractor provided with the towing frame 202, and with part of the coupling system of FIGS. 1 to 6 mounted on its support. It also schematically shows an agricultural implement which is provided with the towed frame 102, and with the part of the coupling system of FIGS. 1 to 6 that is complementary to the part mounted on the tractor.

In FIG. 9, the agricultural implement 100 is arranged facing the rear part of the agricultural tractor 200 without any contact between the two.

As the agricultural tractor 200 is motorized, the agricultural implement 100 remains in place and the agricultural tractor 200 backs up to approach the agricultural implement 200. During this maneuver, the driver of the tractor acts on a hydraulic system of the agricultural tractor 200 in order to tilt the towing frame 202 by means of the upper arm 206 which is of variable length, so that the towing frame 202 forms an angle of about ten degrees with the towed frame 102. The driver also maneuvers so that the base 208 of the towing frame 202 with its centering pins 214 comes under the cap 120 of the towed frame 102, substantially centering the towing frame 202 relative to the towed frame 102. As the agricultural implement 100 is "free", centering is carried out automatically due in particular to the conical shape of the centering pins 214.

Figure 10:
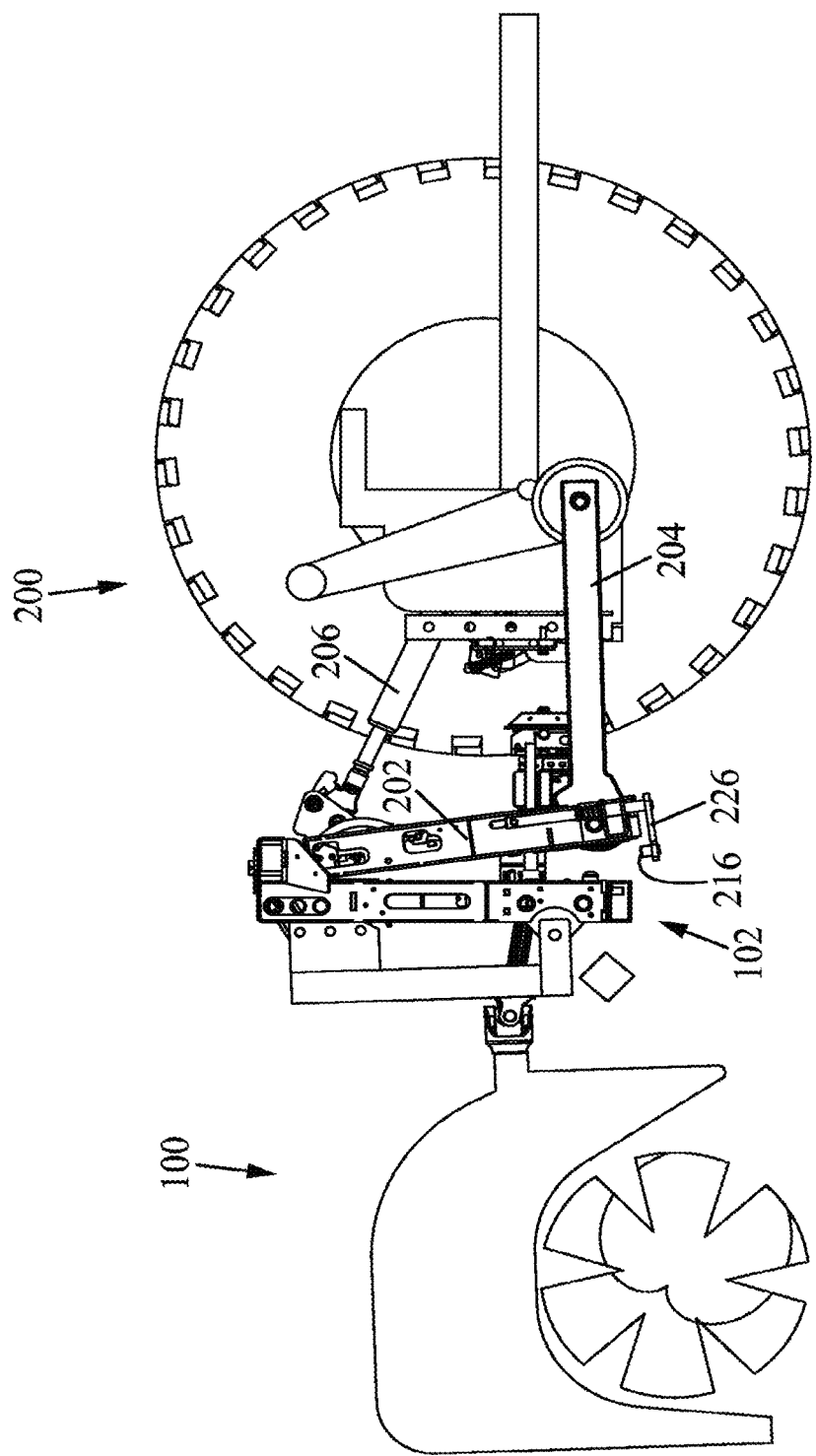
FIG. 10 shows a first step of hitching the implement of FIG. 7 to the rear part of the tractor of FIG. 8.

FIG. 10 shows the towing frame 202 tilted relative to the towed frame 102, the centering pins 214 beginning to enter the corresponding cylindrical housings 122 of the towed frame 102.

In this position, the two parts of the coupling device have come together and a space of ten to several tens of centimeters separates them.

Figure 11:
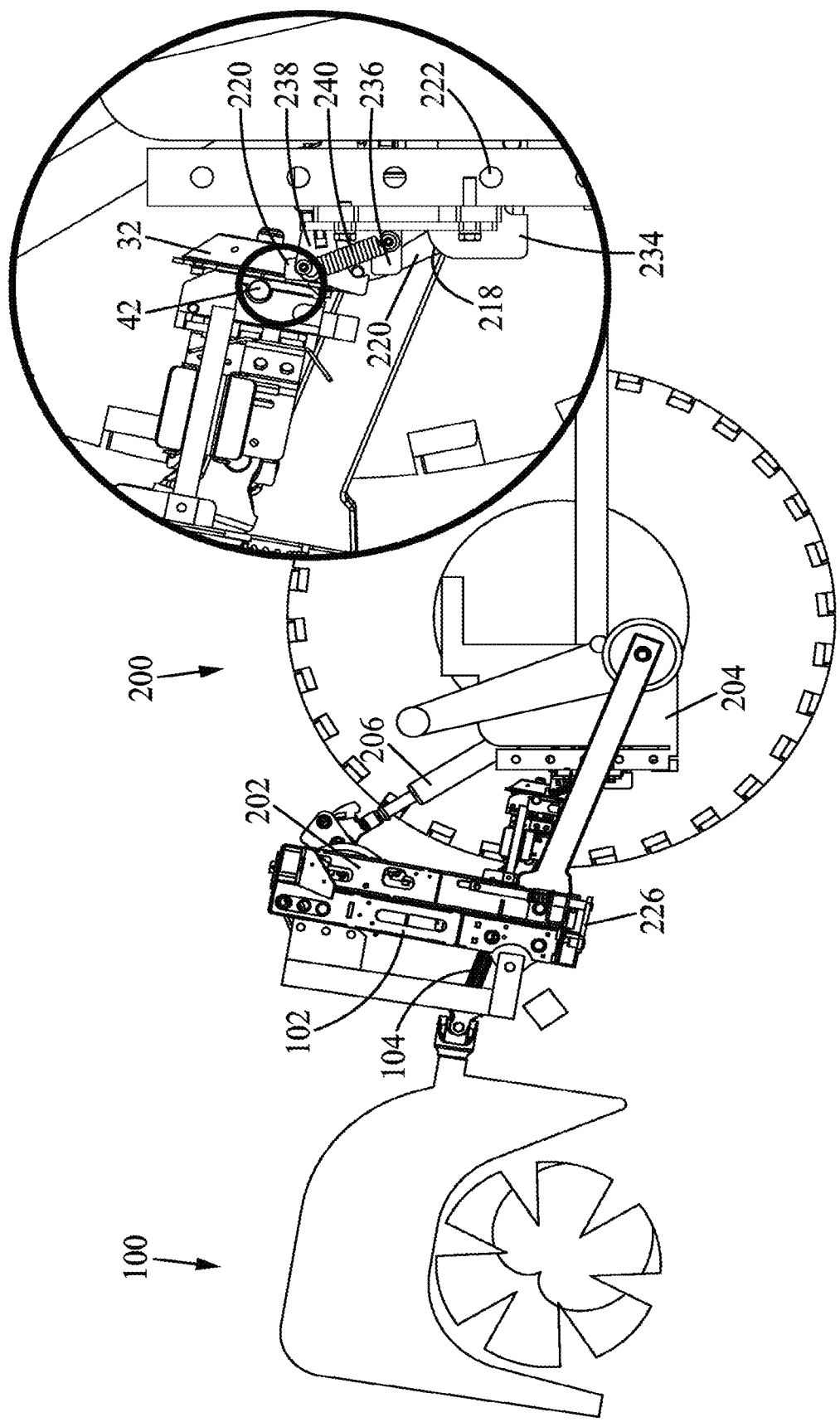
FIG. 11 shows a second step of hitching the implement of FIG. 7 to the rear part of the tractor of FIG. 8, with a detail view of part of the coupling device.

From the position illustrated in FIG. 10, in which the agricultural implement 100 rests on the ground, the three-point lift system is raised. This can cause the agricultural implement 100 to rise as illustrated in FIG. 11, but if the agricultural implement 100 is provided with suspension travel, the wheels of the agricultural implement 100 remain on the ground and only the body of the agricultural implement 100 is raised upwards. During this movement, the towed frame 102 comes to rest against the towing frame and the locking fingers 216 come to face the locking holes 124 without entering therein.

In this position, the two frames are in the unlocked coupled position and the power take-off is not yet driving the drive shaft 104 of the agricultural implement 100.

It can be seen in the detail view of FIG. 11 that the agricultural tractor 200 has a guide device which can comprise a lateral guide plate (it can comprise a second one, symmetrical with the first relative to the second casing 10) which has a rounded upper edge 218 forming a guide surface. This upper edge 218 is intended to engage with a finger 42 which projects from one side of the first casing 6 as will be explained below. This device further comprises an arm 220 hinged on a transverse shaft 222. In FIG. 11, the arm 220 is in the raised position and its end is close to the corresponding finger 42.

Figure 22:
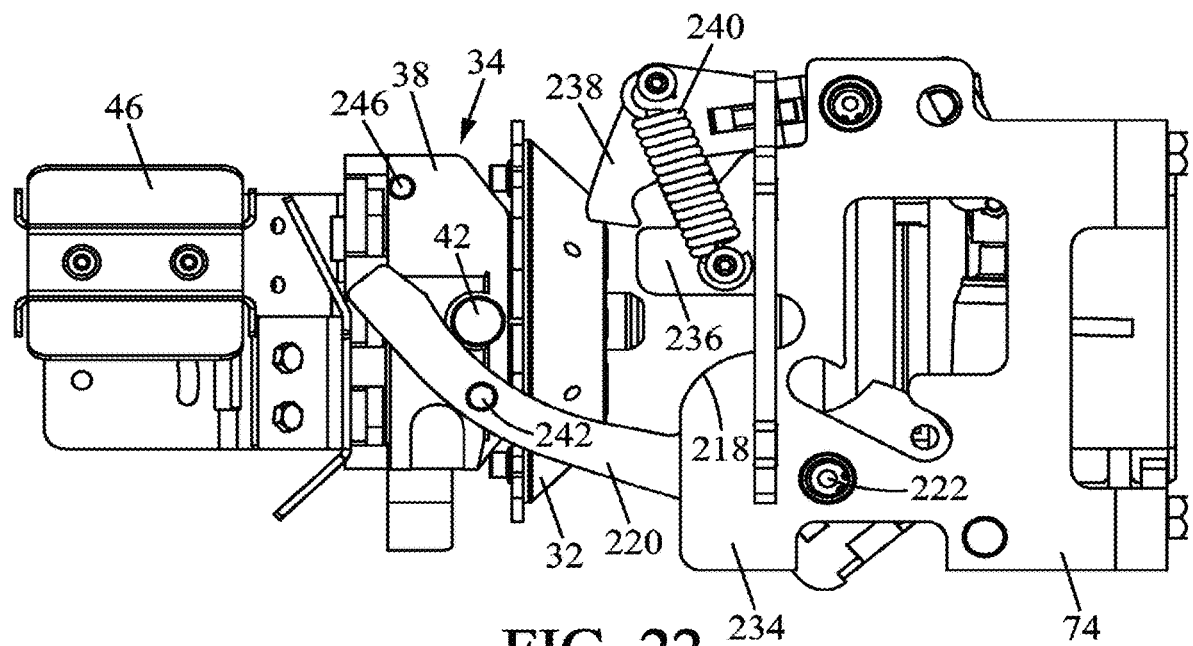
FIG. 22 is a side view of the coupling device of FIG. 1 mounted on a support and provided with a locking device in the open position.
Figure 23:
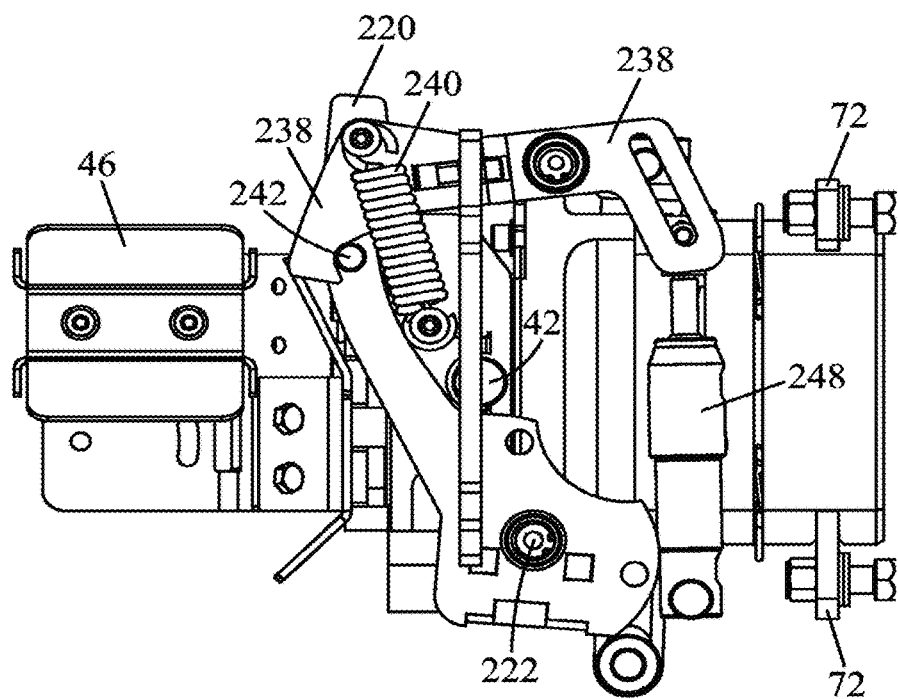
FIG. 23 is a view similar to FIG. 22 with the locking device in the closed position without the support.
Figure 24:
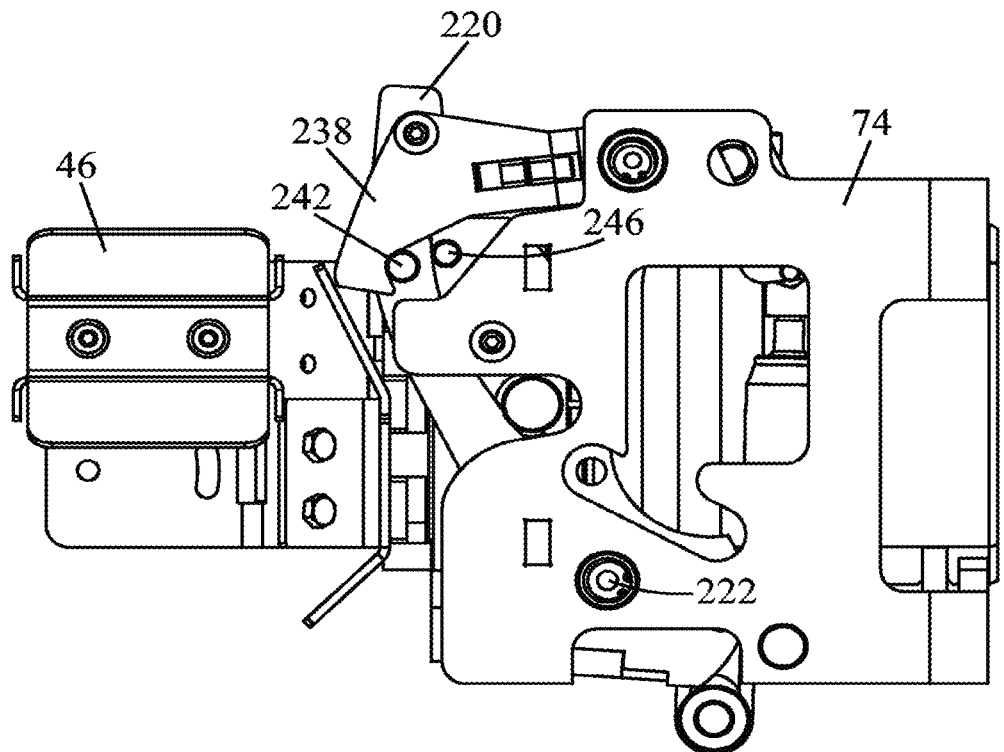
FIG. 24 is a view similar to FIG. 23 with the support but with the removal of a spring.

Above each lateral guide plate 234, there may be a locking device. FIGS. 22 to 25 illustrate an example of a locking device. As illustrated in FIGS. 22 to 24, each locking device has for example two jaws each arranged substantially in the same plane as the corresponding lateral guide plate 234, meaning in a substantially vertical and longitudinal plane (substantially parallel to a longitudinal axis of the tractor). A lower jaw 236 is fixedly mounted on the structure of the agricultural tractor 200 while an upper jaw 238 is hingedly mounted. A housing is defined between the two jaws. By pivoting, the upper jaw 238 opens and closes access to this housing. A return spring 240 prestresses the upper jaw 238 into the closed position and thus forms a latch.

Figure 12:
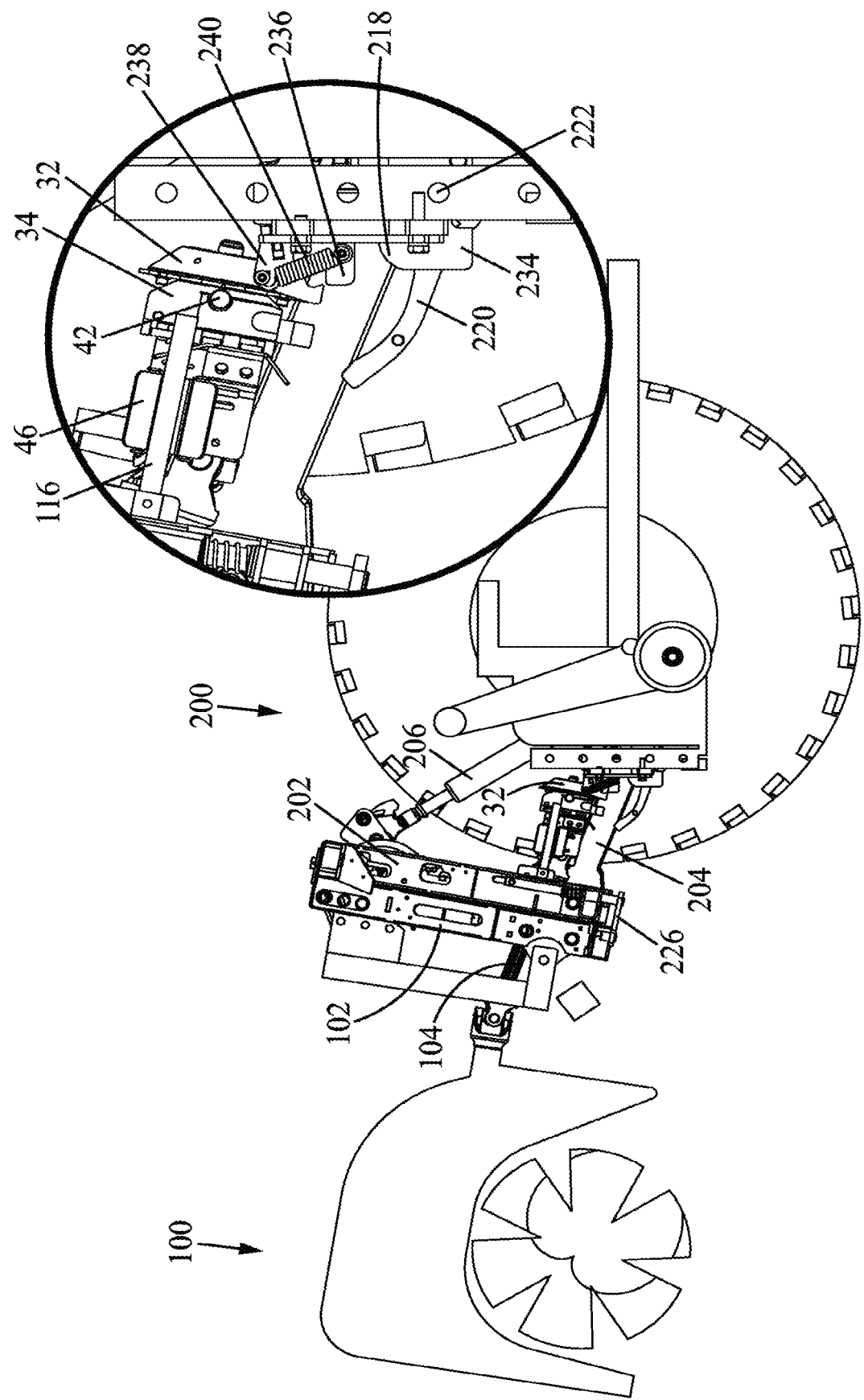
FIG. 12 shows a third step of hitching the implement of FIG. 7 to the rear part of the tractor of FIG. 8, with a detailed view of part of the coupling device.

The arms 220 can then each be actuated by means of a locking cylinder 244 (FIG. 25) in order to move to their lowered position illustrated in FIG. 12. The two arms 220 preferably have a common transverse shaft 222, and a single locking cylinder 244 controls the movement of the arms 220. This locking cylinder 244 is preferably a double-acting cylinder.

Figure 16:
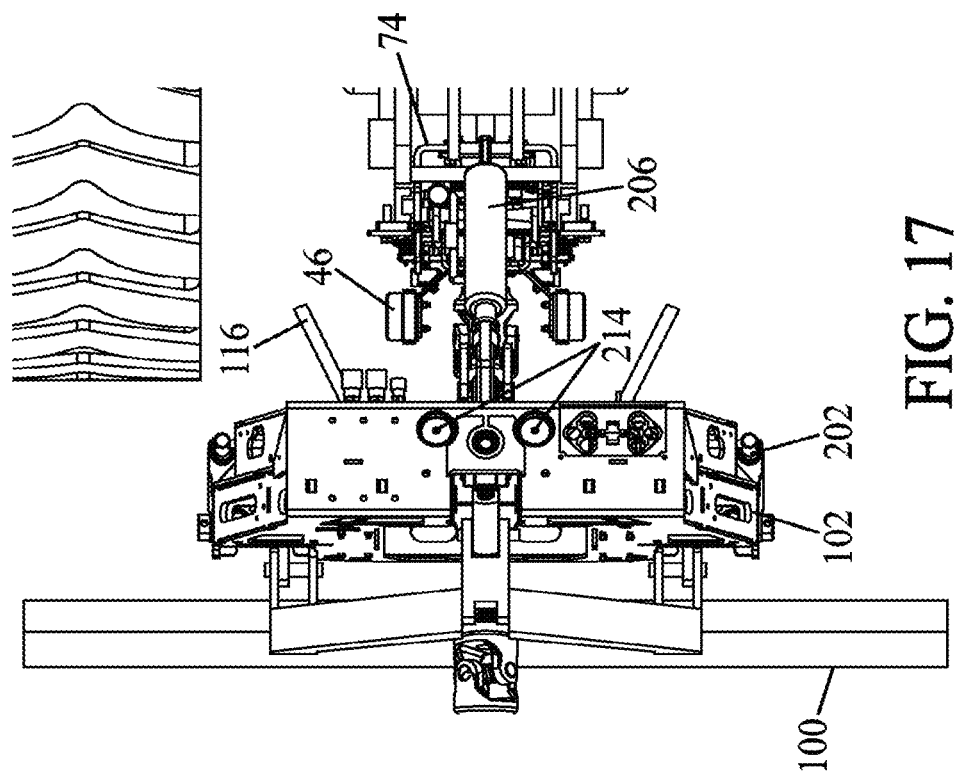
FIG. 16 is a top view corresponding to FIG. 14.
Figure 17:
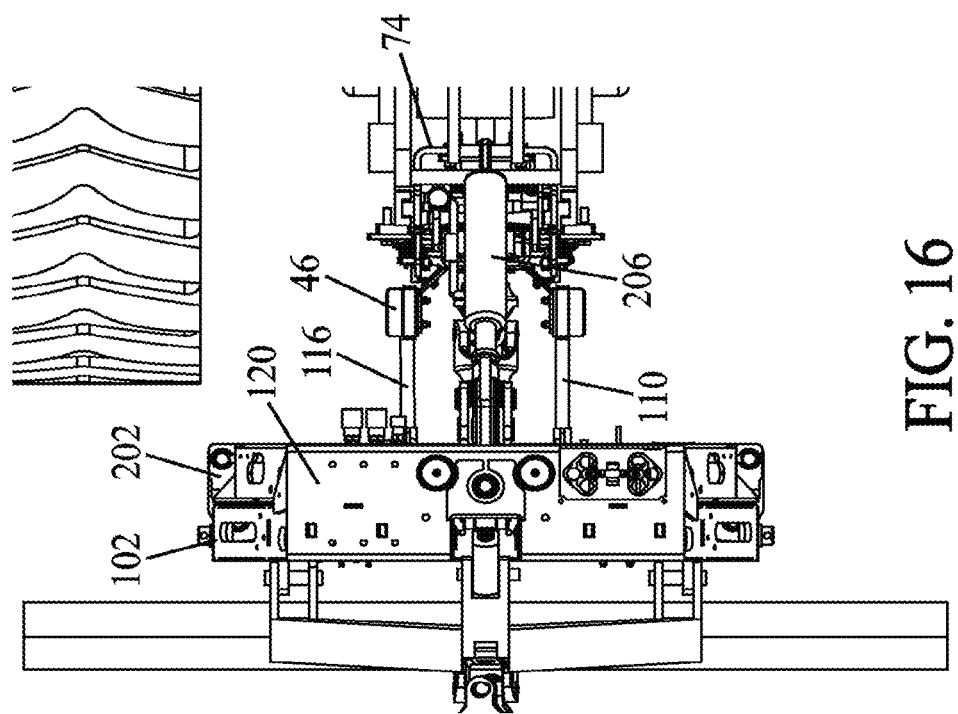
FIG. 17 is a top view corresponding to FIG. 15.

In a preferred embodiment, the lateral guide plate 234 and the lower jaw 236 are implemented directly on the support 74. As can be seen in FIGS. 16 and 17, this support 74 may have a general U-shape, with a vertical base and two vertical side plates. Each of these vertical side plates is then advantageously cut so as to form, on the one hand, the lateral guide plate 234 with its upper edge 218, and on the other hand the lower jaw 236.

We now consider aligning the two parts of the coupling device. The part of the coupling linked to the agricultural implement 100 (FIGS. 11 and 12) is in a higher position than the part of the coupling linked to the agricultural tractor 200. The arms 220 are then brought downward (FIG. 12). The entire part of the coupling device linked to the agricultural implement 100 is then lowered by lowering the two frames (towed frame 102 and towing frame 202) by acting on the cylinder forming the upper arm 206. In this movement, the part of the coupling linked to the agricultural implement 100 is lowered and the fingers 42 each come to rest on the corresponding arm 220 (only a single arm 220 and a single finger 42 are visible in the figures) as illustrated in FIG. 13.

Figure 13:
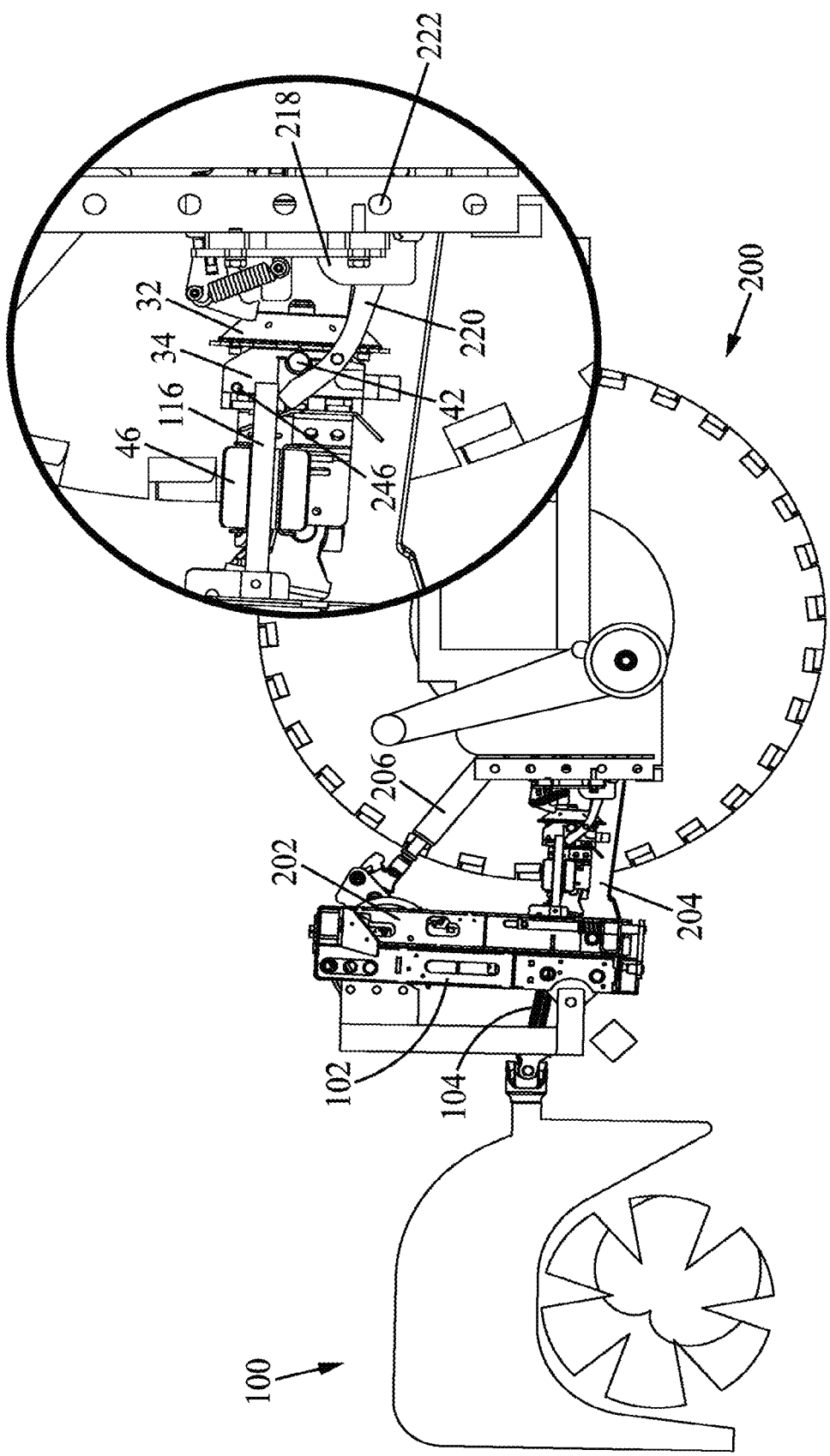
FIG. 13 shows a fourth step of hitching the implement of FIG. 7 hitched to the rear part of the tractor of FIG. 8, with a detailed view of part of the coupling device.
Figure 14:
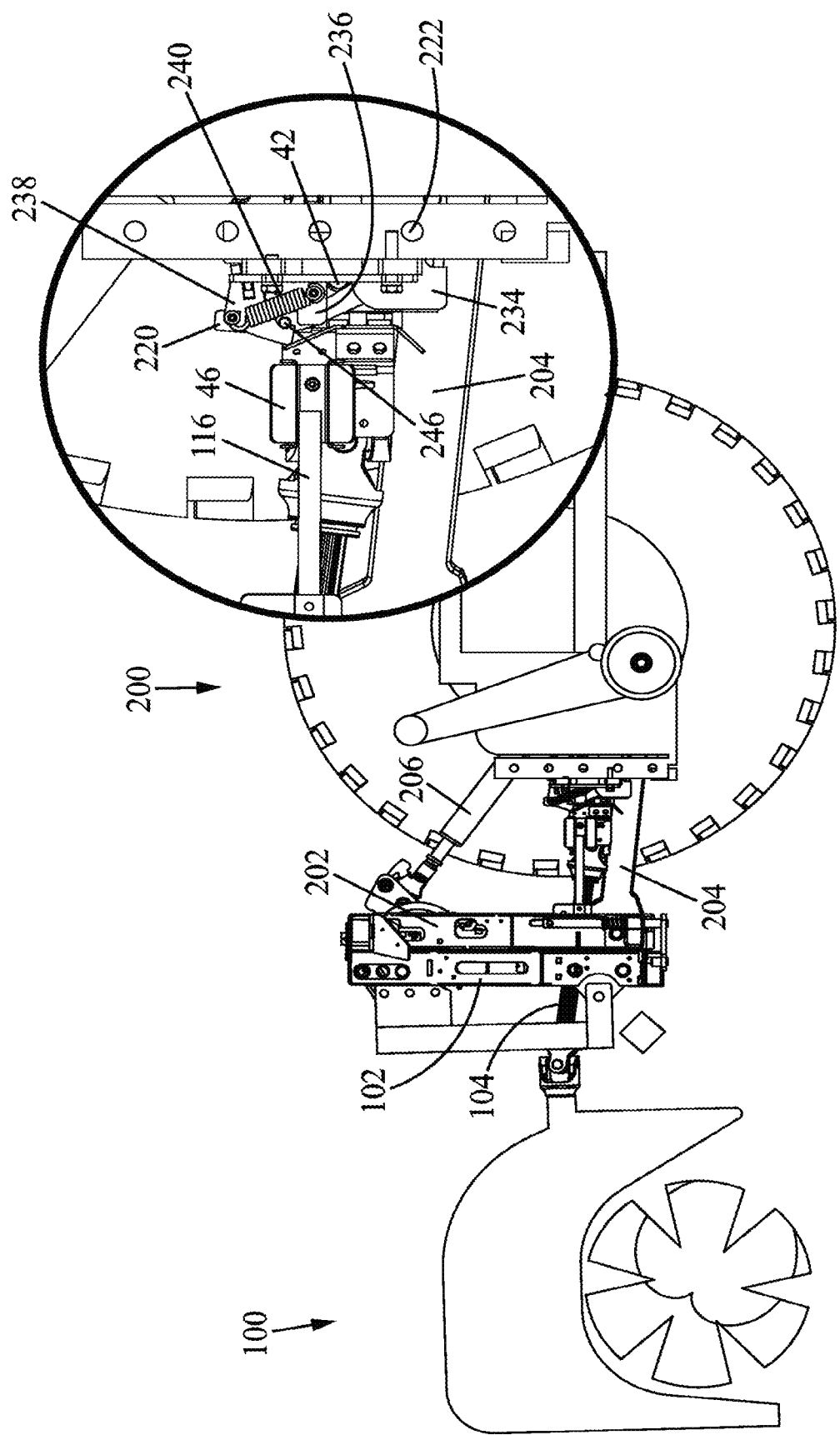
FIG. 14 shows a fifth step of hitching the implement of FIG. 7 to the rear part of the tractor of FIG. 8, with a detailed view of part of the coupling device.

The view of FIG. 22 corresponds substantially to the position illustrated in FIG. 13. The two parts of the coupling device are facing each other, at a distance ranging from a few centimeters to a few tens of centimeters.

The assembly formed by the agricultural implement 100, the towed frame 102, and the towing frame 202, continues its downward movement by means of the cylinder forming the upper arm 206, while in parallel the arms 220 are raised by means of the locking cylinder 244. In this last movement (FIG. 13 to FIG. 14), the arms 220 act on the fingers 42 to move the part of the coupling device linked to the implement closer to the part of the coupling device linked to the tractor. The upper edge 218 of each lateral guide plate 234 contributes to guiding the fingers 42 in the last approach phase, before the part of the coupling device linked to the implement comes into contact with the coupling part linked to the tractor. The upper edge 218 thus guides the corresponding finger 42 towards the bottom of a housing which here has the shape of a notch formed in the lateral guide plate 234. When the finger 42 arrives in the corresponding notch, the arm 220 closes off the notch and the finger is then trapped at the bottom of the notch. The end of travel of the finger 42 is not defined by the bottom of the notch but by the contact between the dog clutch members. The coupling device thus gradually reaches the position illustrated in FIG. 2 then the coupling device for two shafts of FIGS. 1 to 6 transitions in order into the positions illustrated in FIGS. 2 to 4 and commented on above. Usually, a drive shaft of an agricultural implement is of variable length. Thus, when the arms 220 are actuated and cooperate with the fingers 42, the part of the coupling device associated with the agricultural implement 100 moves towards the agricultural tractor 200. In this movement, guidance is provided by the sliding of the ends of the support arms 116 within the U-shaped section parts 46 in which they are housed. By comparing FIGS. 13 and 14, one can see the difference between the relative position of a support arm 116 and its corresponding section part 46. During this movement, the motor shaft of the agricultural tractor 200 is rotated in order to drive the female coupling part and finalize the coupling of the two shafts.

Interlocking the two parts of the coupling device can be achieved by means of the locking devices. Each arm 220 (in theory, only one may be sufficient) has a locking pin 242 intended to engage with the corresponding locking device. Thus, in parallel to the movement illustrated in FIGS. 2 to 4, each locking pin 242 is guided towards the jaws. Each locking pin 242 is positioned on the corresponding arm 220 so that during its travel it comes to bear on the corresponding upper jaw 238 so as to move the jaw against the preload exerted by the corresponding return spring 240. At the end of the movement, the locking pin 242 is in the housing defined between the lower jaw 236 and the upper jaw 238 which acts as a latch due to the action of the return spring 240 and controls the closing of the access to the housing once the locking pin 242 has assumed position therein.

To complete the locking described above, provision is made to create an additional obstruction to better obstruct an additional degree of freedom between the part of the coupling device mounted on the tractor and that mounted on the implement, namely a degree of freedom corresponding to a rotation about an axis perpendicular to the plane of the figures, for example around the fingers 42. To this end, it is proposed to provide the part of the coupling device on the implement side with at least one anti-swiveling pin 246. This pin can also be held by an arm 220. In the embodiment proposed in the drawing for non-limiting and illustrative purposes, an anti-swiveling pin 246 is arranged parallel to each finger 42 on each arm 38 of the support 34. Therefore, two anti-swiveling pins 246 are preferably provided on the support 34, arranged symmetrically relative to a central plane. Each anti-swiveling pin 246 then comes into contact with the corresponding arm 220 in the locked position of the locking device, as illustrated in FIG. 24. In this figure, the support 74, not shown in FIG. 23, is present but the return springs 240 have been hidden to show an anti-swiveling pin 246 in the locked position.

Figure 15:
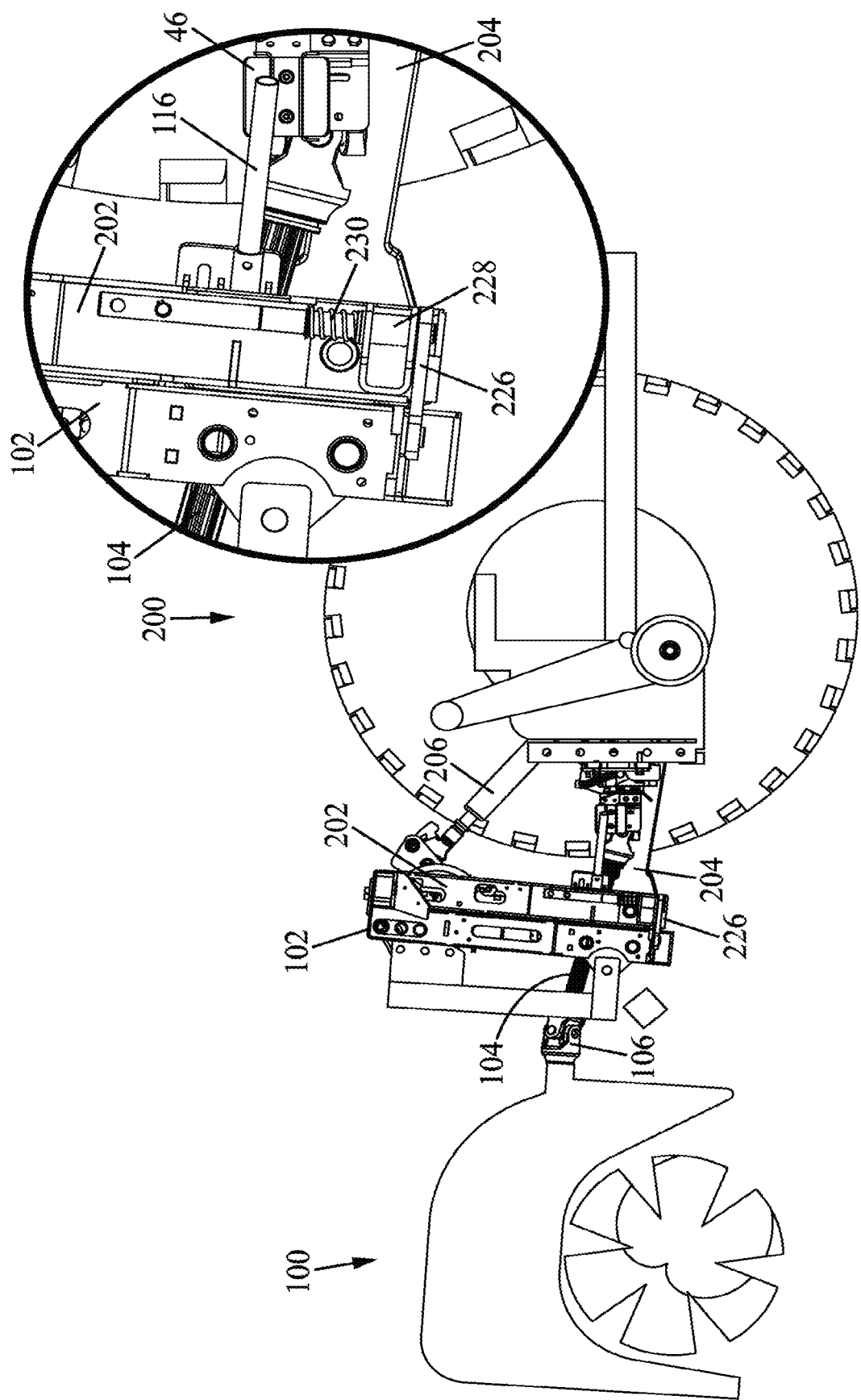
FIG. 15 shows the implement of FIG. 7 in the position hitched to the rear part of the tractor of FIG. 8, with a detailed view of part of the coupling device.

Once the shafts have been coupled, the two frames are locked and the support arms 116 can be pivoted and moved away from the coupling device as illustrated in FIG. 15 showing the system in the hitched and coupled position. Indeed, once the two shafts are coupled and engaged with each other, it is no longer necessary to support the shaft on the agricultural implement 100 side. It is even preferable to leave it free so that it can work unconstrained. Furthermore, the towed frame 102 and the towing frame are locked by engaging the locking fingers 216 with the corresponding locking holes 124. An action of each cylinder 224 makes it possible to act on the corresponding plate 226 and to cause the locking fingers 216 to enter the corresponding locking holes 124.

Figure 20:
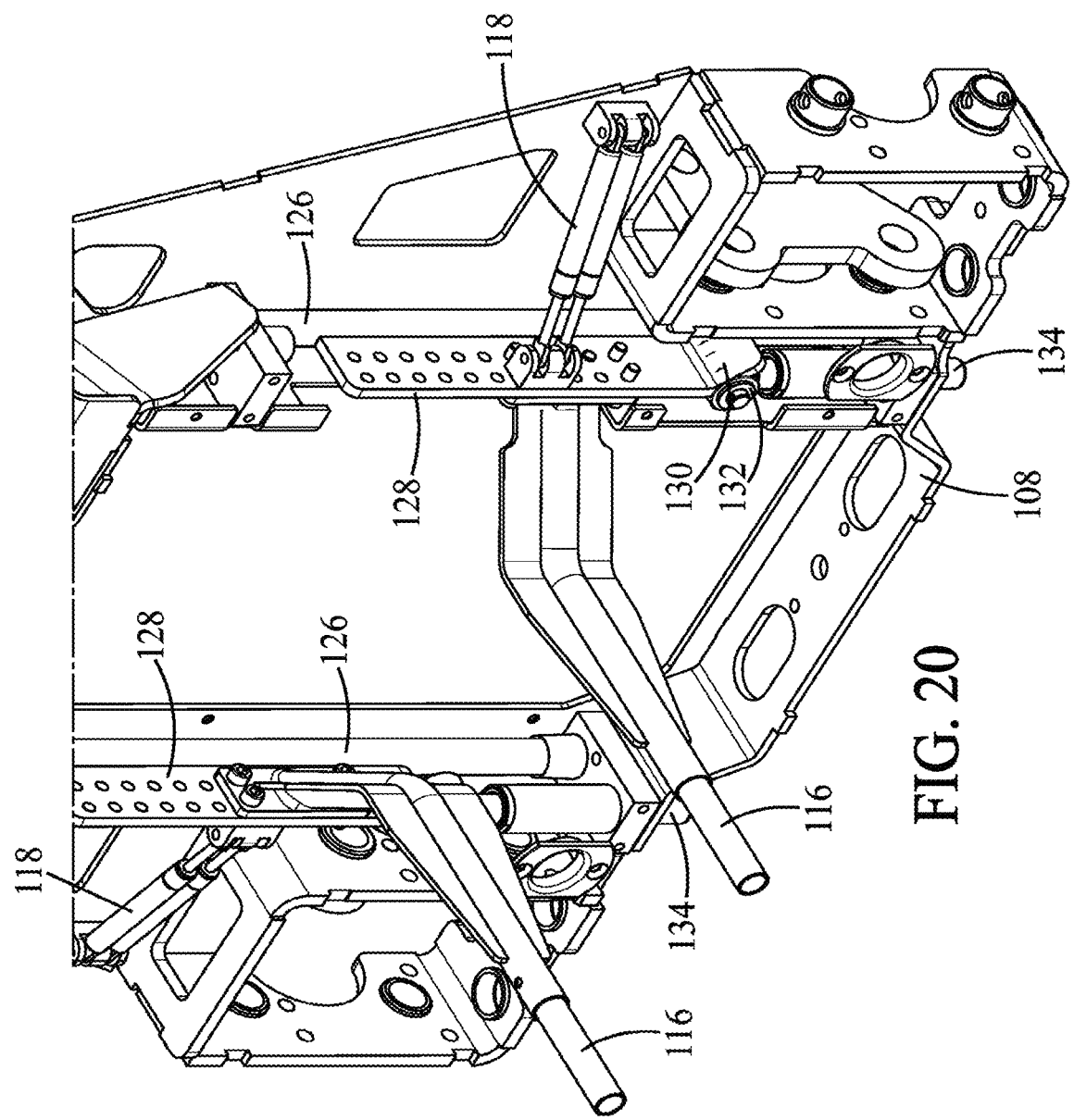
FIG. 20 is a perspective view of details of the towed frame on an enlarged scale.

FIG. 20 illustrates a mechanism making it possible to rotate the support arms 116. As indicated above, these support arms 116 are mounted to pivot about a shaft 126 which extends substantially vertically during "normal" use of the device. In the preferred embodiment illustrated here, the support arms 116 are provided with a plate which is fixed on a perforated plate 128 integrally secured (for example welded) to the shaft 126, which extends in a plane containing the pivot axis of the corresponding support arm 116 and which comprises numerous attachment holes making it possible to position the plate of a support arm 116 in various positions relative to the shaft 126. This last feature makes it possible, fora same towed frame, to adapt to many different agricultural implements. Note that the gas springs 118 are connected at one of their ends to this perforated plate 128.

At its lower end, in each case the perforated plate 128 is angled, thus forming an inclined plane 130 relative to the rest of the perforated plate 128. In FIG. 20, one will note the presence of a roller 132 below this inclined plane. The roller is mounted at the end of an arm 134 which traverses the lower crossmember 108 and protrudes beyond it. This arm 134 is mounted parallel to the shaft 126. The roller 132 and the inclined plane are arranged such that when the roller 132 is pushed (upwards) towards the perforated plate 128 (or towards the upper crossmember 110), then the perforated plate 128 pivots against the stress exerted by the gas springs 118 so as to move the support arm 116 away.

Figure 21:
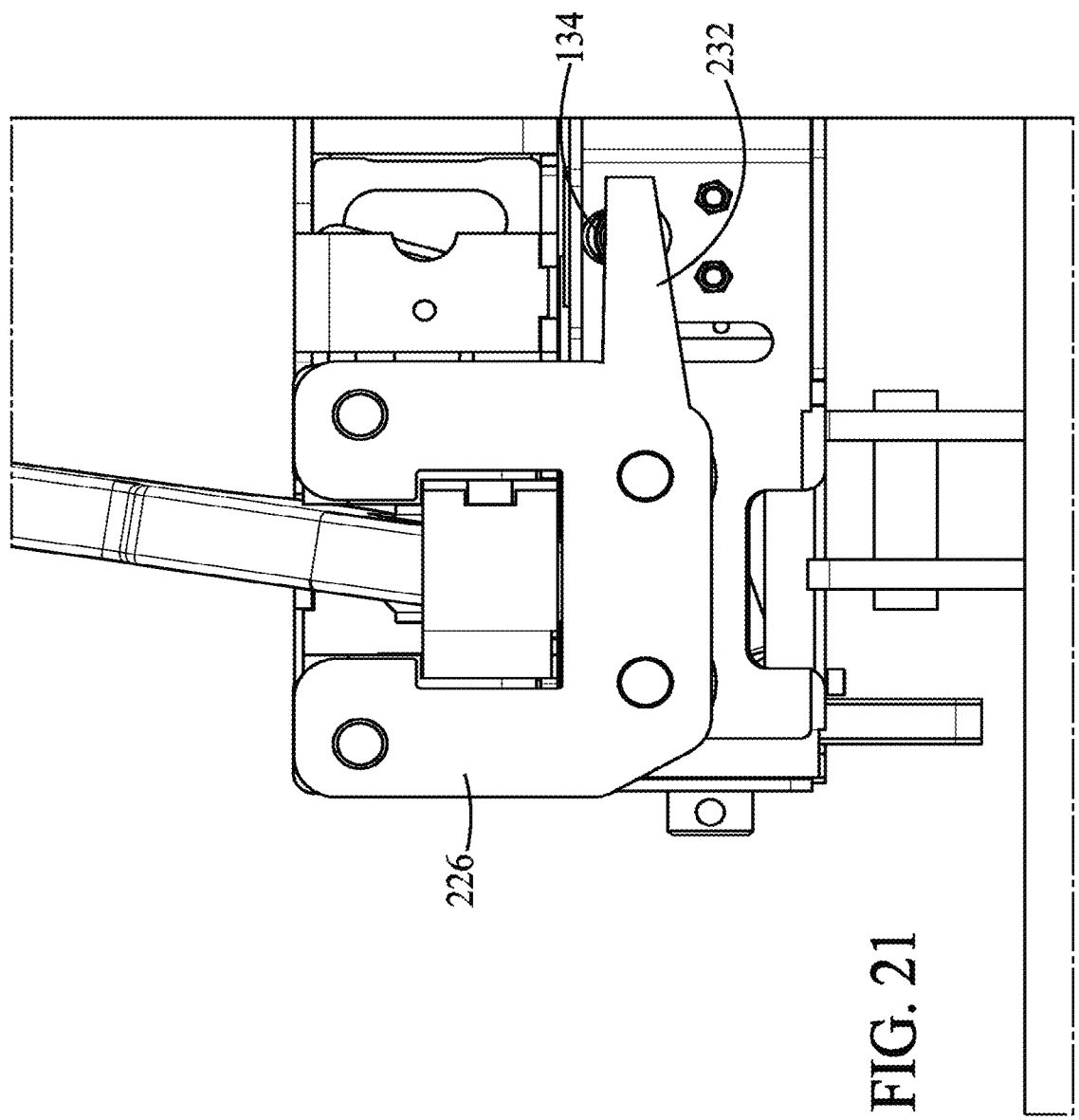
FIG. 21 is a detailed view from below of the two assembled frames, on an enlarged scale.

It is advantageously provided that the action of opening the support arms 116 takes place at the same time as the locking of the towed frame 102 onto the towing frame 202. To do this, as a non-limiting illustration it is proposed that each plate 226 carrying locking fingers 216 has a protuberance 232. As illustrated by FIG. 21, which is an enlarged detailed view from below of the two assembled frames, this protuberance 232 is positioned under the arm 134 carrying the roller 132. Thus, when the locking of the towed frame 102 with the towing frame 202 is achieved by acting on the plate 226 to introduce the locking fingers 216 into the locking holes 124, the protuberance 232 acts on the arm 134 which, via the roller 132, acts on the inclined plane 130 to open the corresponding support arm 116. In the event of a hydraulic problem, the springs 230 maintain the plate 226 in its position corresponding to the locking of the frames, which is the safety position.

FIGS. 16 to 19 are complementary figures enabling a better understanding of the structure of the mechanism described above. FIGS. 16 and 18 correspond to the position illustrated in FIG. 14 (support arms 116 engaging with the U-shaped section parts 46) while FIGS. 17 and 19 correspond to the position illustrated in FIG. 15 (support arms 116 open).

FIGS. 16 and 17 are top views. One can see for example the support 74 on which is fixed the part of the coupling device linked to the agricultural tractor 200. This support 74, in the illustrated embodiment, is in the form of a U-shaped section part with a transverse vertical base (tractor side) which receives the half-clamps 72 and with two side arms (vertical) which extend towards the agricultural implement 202 and which can for example serve as a support (and possibly partly integrate as indicated in the preferred embodiment described) for the guide devices cooperating with the fingers 42 as well as the locking devices each with a lower jaw 236, an upper jaw 238, and a return spring 240.

In summary, the coupling of an implement (in the illustrated example the agricultural implement 100) to a machine (in the illustrated example the agricultural tractor 200) can be achieved as follows.

First, the implement is fitted with a frame called a towed frame while the machine is fitted with another frame called a towing frame. The towed frame is provided with means allowing it to be secured to the towing frame.

In addition, the implement is fitted with a shaft, called a driven shaft, intended to be driven by the machine so as to provide it with energy (or power) to enable it to perform its function. As for the machine, it is equipped with an engine comprising an output shaft, called a power take-off in an agricultural tractor.

The driven shaft of the implement is provided with a part of a coupling device and the output shaft of the machine is provided with a second part of said coupling device.

The part of the coupling device associated with the driven shaft of the implement comprises an element, in one or more parts, which is mounted so that it is integral with the driven shaft (for example mounted with splines and/or pin) and which is provided with a tooth and groove system called the first dog clutch member. This element is pivotably mounted in a first casing.

Similarly, the part of the coupling device associated with the output shaft of the machine comprises an element, in one or more parts, which is mounted so that it is integral with the output shaft and which is provided with a tooth and groove system, or second dog clutch member, intended to engage with the first dog clutch member so that the first dog clutch member comes to drive the second dog clutch member, preferably with the least play possible. Such a dog clutch system allows almost 100% of the power available on the output shaft to be transmitted to the driven shaft if the dog clutch members are properly matched to each other. Here, the element with the second dog clutch member is pivotably mounted in a bearing called an intermediate bearing which itself is mounted in a second casing, fixed on the machine, so as to be able to slide relative to said second casing substantially in parallel to the output shaft.

The first casing and the intermediate bearing are further provided with centering means, preferably conical centering means.

To achieve the coupling of the implement (not motorized) to the machine (motorized), a driver maneuvers the machine in order to bring it closer to the implement. The towing frame is movably mounted on the machine and the driver brings the towing frame closer to the towed frame by adjusting the position (height from the ground and tilt relative to the vertical in particular) of the towing frame to that of the towed frame. On the towed frame, the part of the coupling device carried by the implement is maintained in a predetermined position by a holding and support device such that this part of the coupling device is located substantially facing the other part of the coupling device when the towed frame is facing the towing frame in an approximately corresponding position (for example a few centimeters— from 0 to 20).

The driver maneuvers to hitch the towed frame to the towing frame. The two parts of the coupling device are brought closer to each other. They are arranged on the machine and the implement so that the conical parts of the first casing and of the intermediate bearing come into contact with each other during this maneuvering. In this manner, an automatic centering of these two coupling parts is achieved, resulting in bringing the first dog clutch member to face the second dog clutch member. A matching system, for example with at least one arm mounted on a part of the device engaging with a finger mounted on the other part of the device, optionally controlled hydraulically, is used to finish centering the conical parts relative to each other. The two dog clutch members are then first aligned without coming into contact with each other. When sufficient force (predetermined based on the dimensions of the system) is exerted between the two conical parts in the direction of the machine, the intermediate bearing moves towards the machine by sliding relative to the second casing, thus allowing the teeth of the first dog clutch member to come into contact with the teeth of the second dog clutch member. There is little chance here that the teeth of one dog clutch member will match the grooves of the other dog clutch member, but this can happen. To mesh the dog clutch members, the machine's output shaft is rotated. Preloading means push the intermediate bearing towards the implement so that during rotation the two dog clutch members come to mesh with each other. The shafts are coupled. The frames can then be locked together. Preferably, the holding and support means of the part of the coupling device associated with the implement are shifted so that the first casing can move freely.

As described above, in parallel with this coupling operation, locking can take place automatically. After unlocking, uncoupling is carried out in the reverse order.

Figure 25:
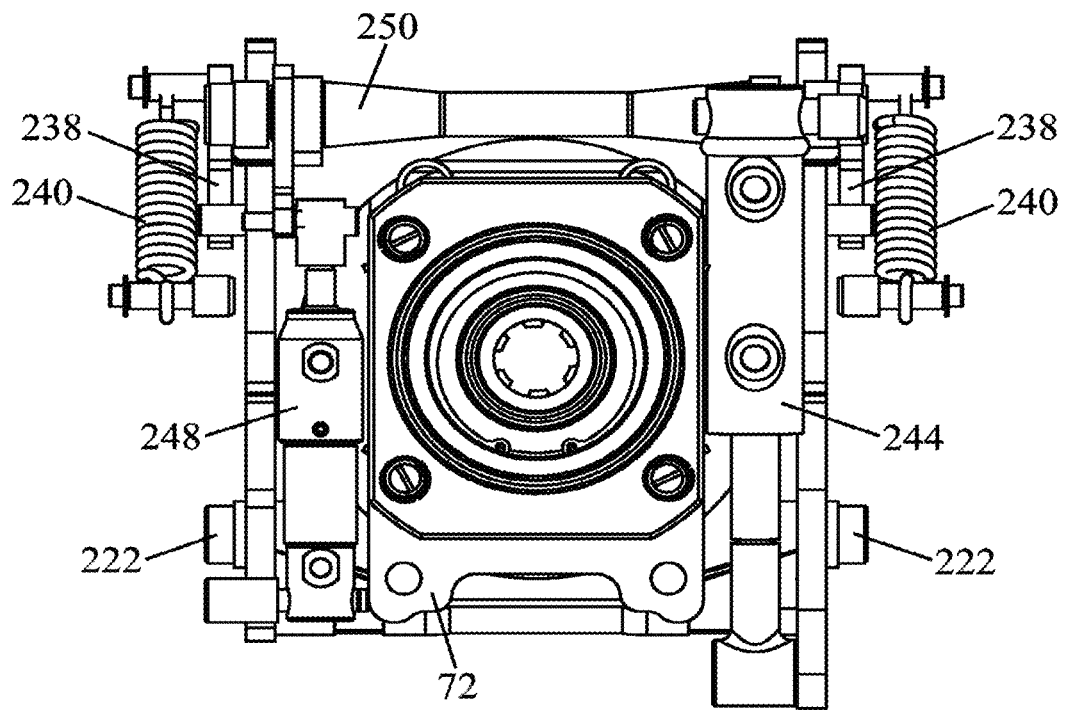
FIG. 25 is a rear view of part of the coupling device illustrated in FIGS. 22 to 24.

To perform the unlocking, it is sufficient to open each upper jaw 238. Here again, as for the arms 220, provision is made to make the two upper jaws 238 integral by connecting them by a coupling shaft 250 (FIG. 25). A release cylinder 248 is then provided to act on an upper jaw 238 to open it. By means of the coupling shaft 250, the release cylinder 248 then also controls the opening of the other upper jaw 238.

The hitching device presented allows a driver of an agricultural tractor to hitch an agricultural implement without having to leave the driving station of his tractor. The mechanical coupling and hitching of the agricultural implement can be done simply and safely. No manual intervention on the agricultural implement 100 and/or on the hitching of the agricultural tractor 200 is required.

Similarly, it is possible to remove the agricultural implement hitched to the agricultural tractor with no manual intervention, thus limiting any risk of injury.

The coupling system allows complete transmission of power from the tractor to the implement. Due to the perfect alignment of the shafts, no wear or unwanted stress is exerted on the system.

Once hitched, the operation of the implement is not affected in any way and it is as if the implement had been hitched directly to the tractor's three-point hitch system.

Of course, the invention is not limited to the preferred embodiment described and illustrated in the drawings and to the variants mentioned. It also relates to all variant embodiments within the reach of those skilled in the art within the scope of the following claims.

The invention claimed is:

1. Coupling device for coupling two shafts end-to-end, comprising a pair of dog clutch members, each dog clutch member being configured so as to be able to be secured to an end of a shaft to be coupled, and the two dog clutch members being of complementary shapes, characterized in that a first dog clutch member is rotatably mounted in a first casing, in that a second dog clutch member is rotatably mounted in an intermediate bearing, in that the intermediate bearing is slidably mounted in a second casing assumed to be fixed, the intermediate bearing being able to slide relative to the second casing in a direction parallel to the two shafts to be coupled, termed the longitudinal direction, and in that the intermediate bearing is elastically prestressed in the direction of the first casing.

2. Coupling device according to claim 1, wherein the first casing carries a first conical surface facing the second casing, wherein the second casing carries a second conical surface facing the first casing, the two conical surfaces being of complementary shapes so as to achieve an alignment of the two shafts, wherein the second conical surface is mounted to slide longitudinally relative to the casing which carries it, and wherein the second conical surface is elastically preloaded in the direction of the other conical surface.

3. Coupling device according to claim 2, wherein the second conical surface and the corresponding casing are provided with delay means such that movement of said second conical surface can only be initiated when a predefined minimum load in the longitudinal direction is exerted on said second conical surface towards the casing which carries it.

4. Coupling device according to claim 3, wherein the delay means comprise at least one guide rod integral with the second conical surface, wherein said guide rod comprises a region of narrowed cross-section which can slide within a bore inside the corresponding casing, wherein the corresponding casing comprises a slot extending transversely relative to the bore at least partially receiving the guide rod and intersecting said bore, and wherein an elastic member having two arms is housed in said slot, the narrowed cross-section being arranged between the two arms of the elastic member.

5. Coupling device according to claim 1, wherein it further comprises connection means, said connection means comprising, on each side of a dog clutch member in each case, a projection integral with the corresponding casing, the other casing carrying, on the one hand, guide means in each case for bringing a projection towards a housing, and on the other hand, a hook mounted to pivot about a transverse shaft between a so-called open position allowing the projection to enter and exit its housing and a so-called closed position in which the hook can keep the projection in its housing by preventing its exit.

6. Coupling device according to claim 5, wherein the two hooks are mounted to pivot on a common transverse shaft, and wherein the movement of the hooks is controlled by a double-acting hydraulic cylinder.

7. Coupling device according to claim 5, wherein at least one hook carries a locking pin intended to cooperate with a pair of jaws, said jaws being carried by the same casing as the one carrying the hooks and being arranged so that the locking pin is located between the jaws when the corresponding hook is in the closed position.

8. Coupling device according to claim 7, wherein, for each pair of jaws, one jaw is fixed and the other is movable, wherein a return spring prestresses the movable jaw towards the fixed jaw, and wherein a cylinder makes it possible to act against the return spring to move the movable jaw away from the fixed jaw.

9. Hitching device for hitching an implement-to a lifting system of a machine equipped with a driving output shaft, comprising:
a towing frame equipped with attachment members enabling attachment to the lifting system of the machine,
a towed frame equipped with attachment members enabling attachment to the implement,
the towing frame and the towed frame each having a joining face, said joining faces being suitable for enabling the pairing of the towed frame to the towing frame,
means for relative locking of the towed frame to the towing frame in the paired position,
wherein
said hitching device further comprises a coupling device for coupling two shafts end-to-end according to claim 1,
said coupling device being configured to be mounted between the driving output shaft of the machine and a driven shaft of the implement.

10. Hitching device according to claim 9, wherein the towed frame comprises two arms mounted to pivot between a close-together position in which the free ends of the arms carry the first casing of the coupling device and an open position in which the arms are spaced apart and their free ends are at a distance from the first casing.

11. Hitching device according to claim 9, wherein the towing frame has a welded structure comprising a crossmember from which two legs extend on a same side of said crossmember, and wherein the towed frame has a welded structure comprising an upper crossmember, a lower crossmember, and two uprights connecting the ends of the lower crossmember to the ends of the upper crossmember, wherein the crossmember of the towing frame has at least two centering pins, wherein the upper crossmember of the towed frame comprises a cap extending towards the towing frame and having at least two housings each intended to receive a centering pin.

12. Hitching device according to claim 11, wherein each leg of the towing frame has at its free end a plate on which is arranged at least one locking finger and wherein the lower crossmember of the towed frame comprises locking holes arranged to accommodate the locking fingers.

13. Hitching device according to claim 11, wherein it comprises actuating means for actuating the pivotably mounted arms, said actuating means cooperating with the plate on which is arranged at least one locking finger such that, in the locking position of the towed frame to the towing frame, the arms are in their open position.

14. Hitching device according to claim 9, wherein the first casing of the coupling device is mounted on the towed frame is mounted on the towing frame side.

* * * * *